(12) United States Patent
Wailes et al.

(10) Patent No.: US 8,145,416 B2
(45) Date of Patent: Mar. 27, 2012

(54) INTERACTIVE MAPPING METHOD AND SYSTEM

(75) Inventors: Thomas Wailes, Sunnyvale, CA (US); Gareth J. Finucane, San Francisco, CA (US); Michael J. Lawless, Oakland, CA (US); Mark E. Wehner, Mountain View, CA (US); Rodney J. Fernandez, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1393 days.

(21) Appl. No.: 11/581,145

(22) Filed: Oct. 13, 2006

(65) Prior Publication Data

US 2007/0088897 A1    Apr. 19, 2007

Related U.S. Application Data

(60) Provisional application No. 60/727,206, filed on Oct. 14, 2005.

(51) Int. Cl.
*G06F 17/30* (2006.01)

(52) U.S. Cl. .................................. 701/201; 340/995.1
(58) Field of Classification Search .................. 701/201; 340/995.1
See application file for complete search history.

(56) References Cited

U.S. PATENT DOCUMENTS

| 6,160,552 | A * | 12/2000 | Wilsher et al. ............... 715/739 |
| 7,472,019 | B2 | 12/2008 | Hara |
| 2003/0182052 | A1 | 9/2003 | DeLorme et al. |
| 2004/0054428 | A1 | 3/2004 | Sheha et al. |
| 2005/0027705 | A1 | 2/2005 | Sadri et al. |
| 2005/0251331 | A1 * | 11/2005 | Kreft ............................ 701/207 |
| 2006/0026170 | A1 | 2/2006 | Kreitler et al. |
| 2006/0200305 | A1 * | 9/2006 | Sheha et al. ................. 701/200 |
| 2006/0244638 | A1 * | 11/2006 | Lettau ......................... 340/995.1 |
| 2007/0032945 | A1 * | 2/2007 | Kaufman ....................... 701/208 |
| 2007/0033089 | A1 * | 2/2007 | Dharmarajan et al. ........... 705/9 |
| 2007/0096945 | A1 * | 5/2007 | Rasmussen et al. ........ 340/995.1 |

(Continued)

FOREIGN PATENT DOCUMENTS

JP   2000-010471   1/2000

(Continued)

OTHER PUBLICATIONS http://web.archive.org/web/20050604082524/www.google.com/help/maps/tour/.*

(Continued)

*Primary Examiner* — Kim Nguyen
(74) *Attorney, Agent, or Firm* — Greenberg Traurig, LLP

(57) ABSTRACT

Method and computer program product for presenting a set of address locations in a browser window of a user device via the Internet are disclosed. The method includes receiving a set of address locations in a given order, presenting the set of address locations as a list of directions, and presenting the set of address locations graphically on a map, where the map includes a route connecting the set of address locations according to the given order and a marker for each of the address locations. The method further includes creating a new order of the set of address locations from the given order by dragging an address location from the map to a different position in the list of directions, updating the list of directions according to the new order of the set of address locations, and updating the map according to the new order of the set of address locations.

18 Claims, 29 Drawing Sheets

U.S. PATENT DOCUMENTS

2008/0036778 A1*  2/2008  Sheha et al. .................. 345/502
2010/0042427 A1*  2/2010  Graham et al. .................. 705/1

FOREIGN PATENT DOCUMENTS

| | | |
|---|---|---|
| JP | 2000-010475 | 1/2000 |
| JP | 2003-247850 | 5/2003 |
| JP | 2003-214869 | 7/2003 |
| JP | 2004-340827 | 2/2004 |
| JP | 2005-284340 | 10/2005 |
| WO | WO-2007/047485 A1 | 4/2007 |

OTHER PUBLICATIONS

European Examination Report mailed on Jan. 1, 2009, for European Patent Application No. 06825936.5, filed on Oct. 13, 2006, three pages.

DeLorme. (2002). "Street Atlas USA 2003 User Guide," located at <http://support.radioshack.com/support_computer/docs69/69511.pdf>, last visited on Feb. 21, 2007. (142 pages).

Google. (2006). "Google Maps," located at <http://www.google.com/maps?f=d&hl=en&saddr=755+Page+Mill+Road,+Palo+Alto,+CA...>, last visited on Sep. 14, 2006. (1 page).

International Search Report mailed on Mar. 6, 2007, for PCT Application No. PCT/US2006/040178 filed on Oct. 13, 2006, five pages.

Wikipedia. (Date Unknown). "Ajax (programming)," located at <http://en.wikipedia.org/wiki/AJAX>, last visited on Mar. 14, 2007. (7 pages).

Windows. (2006). "Windows Live™ Local," located at <http://local.live.com/PrintableMap.aspx?mkt=en-us>, last visited on Sep. 14, 2006. (2 pages).

Yahoo! (2006). "Yahoo! Local Maps," located at <http://maps.yahoo.com>, last visited on Sep. 14, 2006. (1 page).

International Preliminary Report on Patentability mailed on Apr. 24, 2008, for PCT/US2006/040178, filed on Oct. 13, 2006, eight pages.

* cited by examiner

INTERACTIVE MAPPING METHOD AND SYSTEM

CROSS-REFERENCE TO RELATED APPLICATIONS

This application claims the benefit of application No. 60/727,206, "Interactive Mapping Method and System," filed Oct. 14, 2005, which is incorporated herein in its entirety by reference.

FIELD OF THE INVENTION

The present invention relates to the field of computer-network-based mapping. In particular, the present invention relates to an interactive mapping method and system.

BACKGROUND OF THE INVENTION

With the increasing popularity of the Internet, millions of users use the Internet to get maps of address locations of interest to them or to get driving directions for getting to such address locations. With conventional map applications, a user would enter a start address and an end address in order to get a driving direction. The conventional map applications would return a map and a list of driving directions from the start address to the end address.

One drawback of the conventional map applications is that they are limited to a point-to-point solution, for getting from point A to point B, for example. However, if the user wants to visit a number of other address locations in the same trip, he would have to break down the whole trip into a series of point-to-point entries and get the map and driving directions for each point-to-point entry separately. This conventional approach involves printing multiple maps and their corresponding driving directions on multiple pages of paper, typically one page for each point-to-point entry. It is not only time-consuming but also a waste of resources because of the multiple maps and their corresponding driving directions that the user has to create and print.

Therefore, there is a need for a new interactive mapping method and system to address the drawbacks of the conventional map applications.

SUMMARY

The present invention generally relates to an interactive mapping method and system. In one embodiment, a method for presenting a set of address locations in a browser window of a user device via the Internet includes receiving a set of address locations in a given order, presenting the set of address locations as a list of directions, and presenting the set of address locations graphically on a map, where the map includes a route connecting the set of address locations according to the given order and a marker for each of the address locations. The method further includes creating a new order of the set of address locations from the given order by dragging an address location from the map to a different position in the list of directions, updating the list of directions according to the new order of the set of address locations, and updating the map according to the new order of the set of address locations.

BRIEF DESCRIPTION OF THE DRAWINGS

The aforementioned features and advantages of the invention as well as additional features and advantages thereof will be more clearly understandable after reading detailed descriptions of embodiments of the invention in conjunction with the following drawings.

FIGS. 1a-1d illustrate a multipoint routing method according to embodiments of the present invention.

FIGS. 8a-8c illustrate an address-to-business lookup method according to embodiments of the present invention.

DESCRIPTION OF EMBODIMENTS

The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of procedures, steps, logic blocks, processing, and other symbolic representations of operations on data bits that can be performed on computer memory. A procedure, computer-executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

In various embodiments, the interactive mapping method and system of the present invention implement Web 2.0 functionalities using a combination of HTML, CSS, JavaScript, Asynchronous JavaScript and XML (AJAX), Y!Q, Yahoo! Maps, Yahoo! Widget Engine, and Yahoo! Toolbar for Internet Explorer.

Figure 1A:
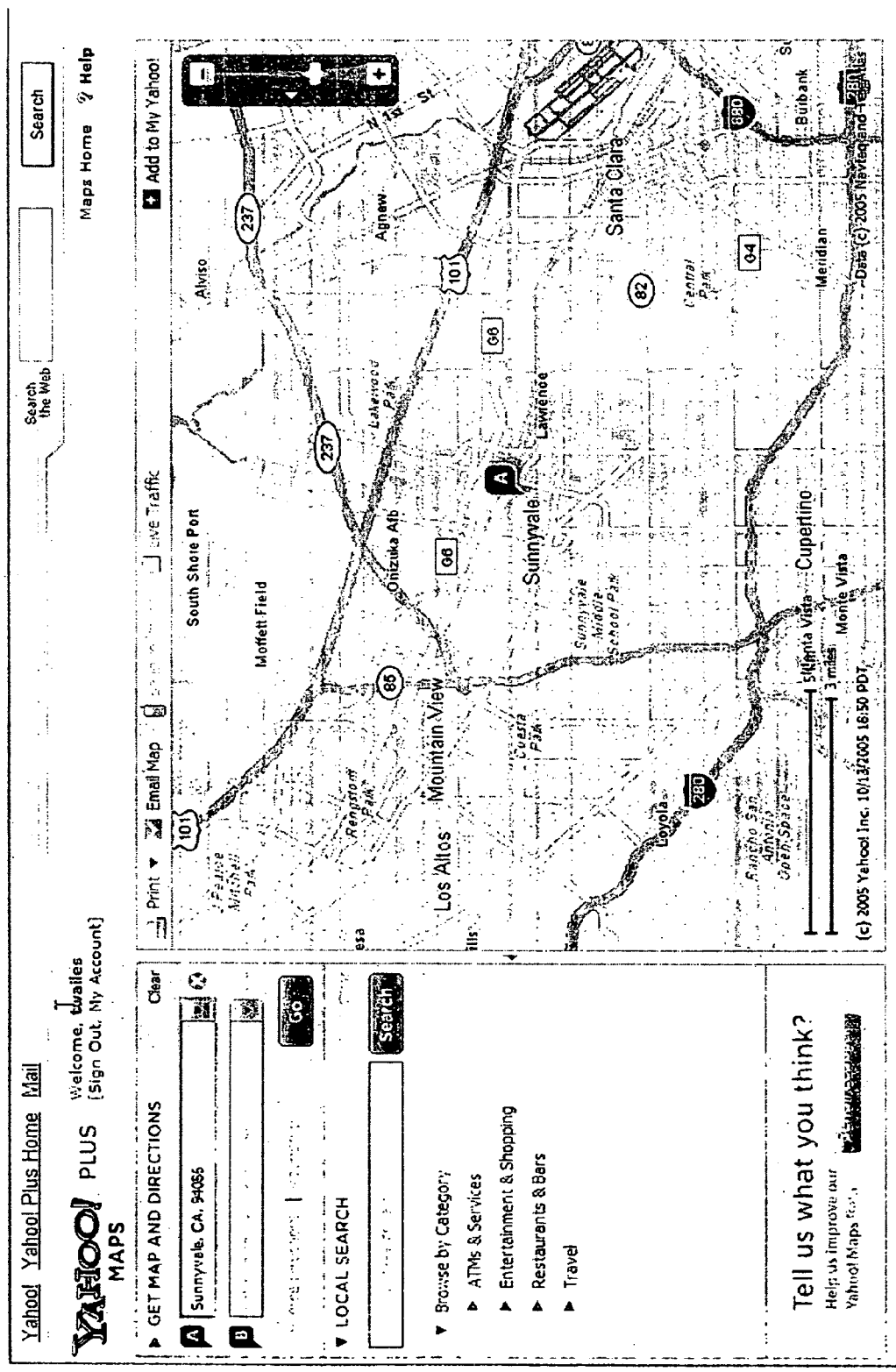
Figure 1B:
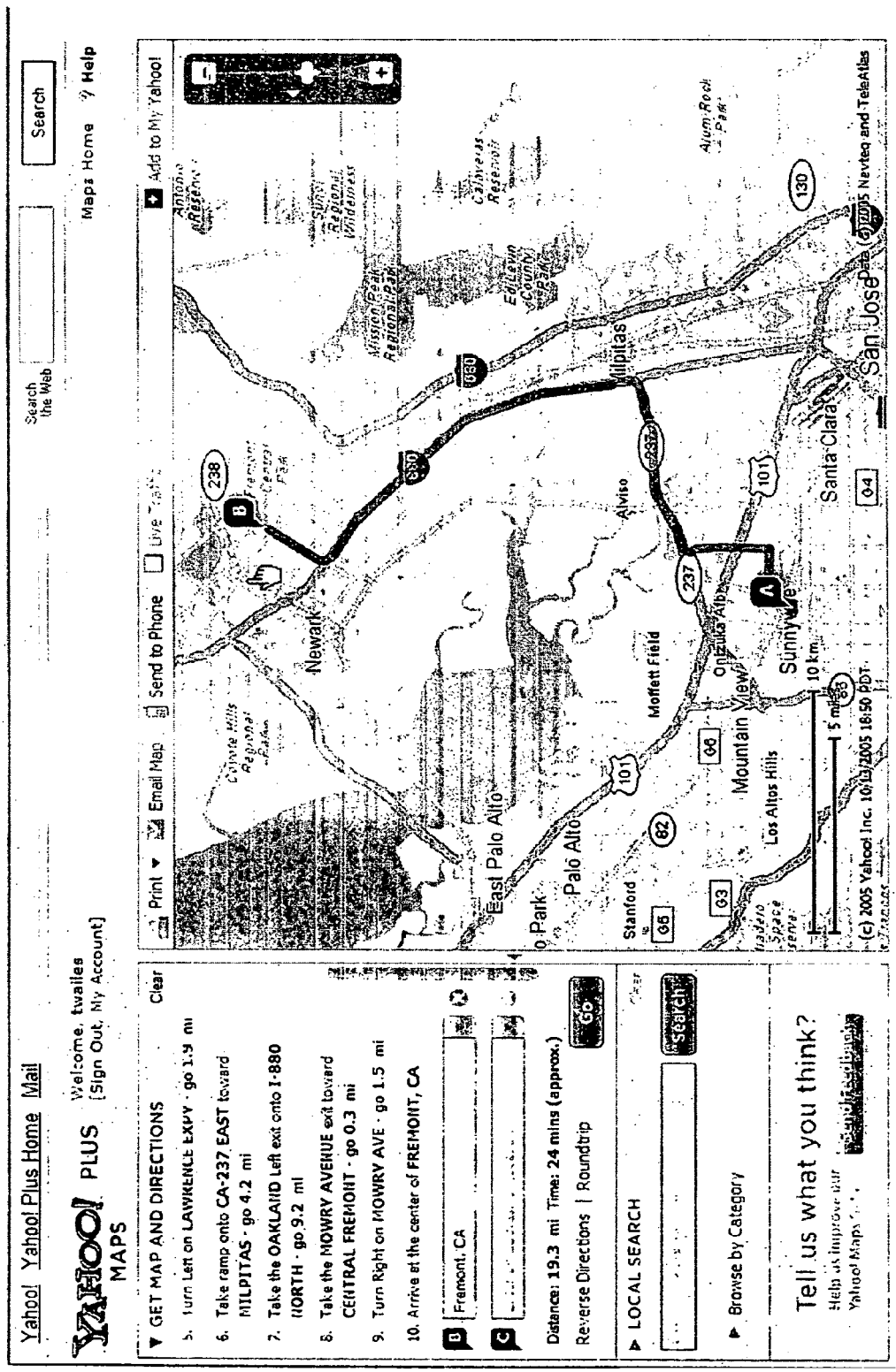
Figure 1C:
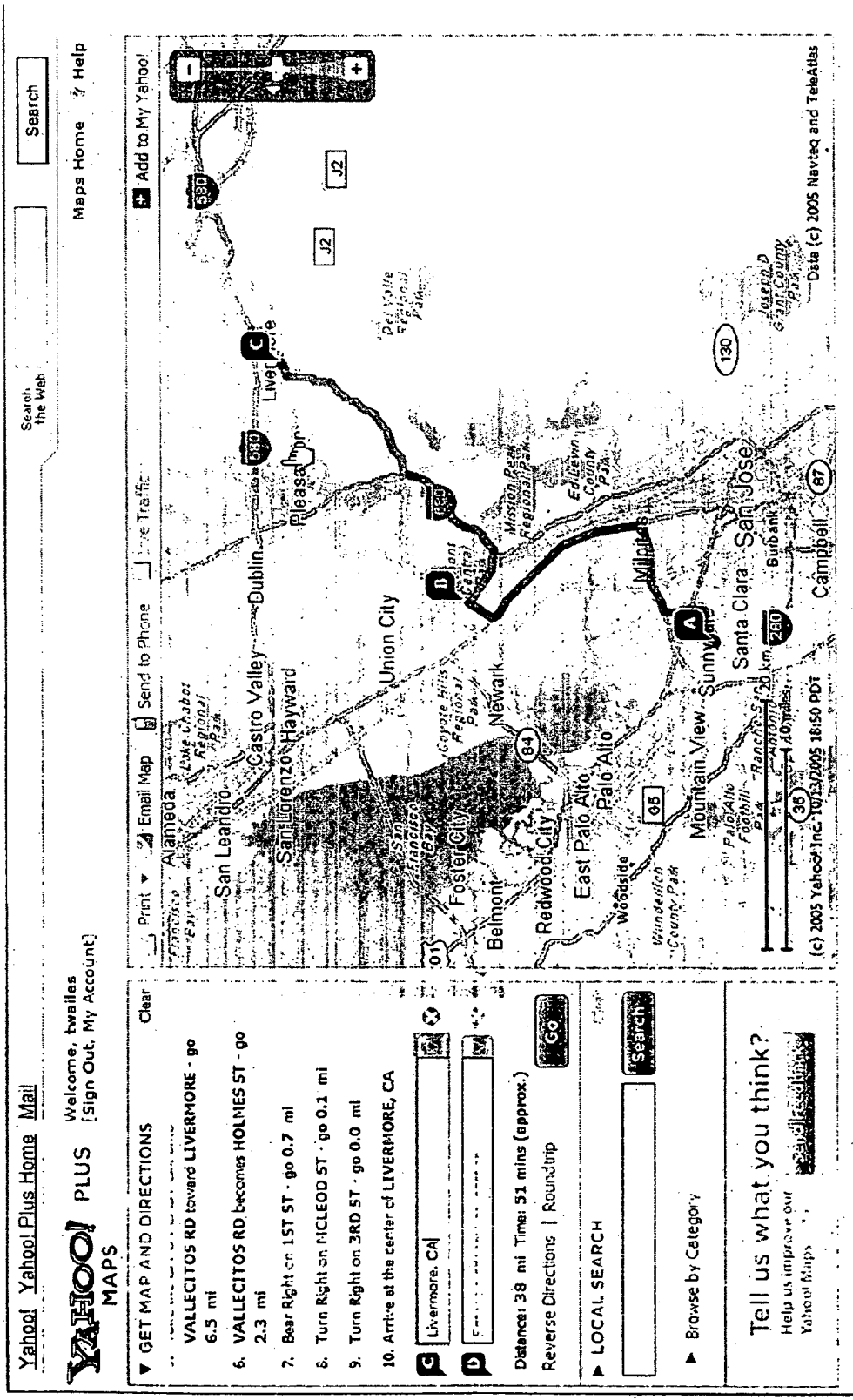
Figure 1D:
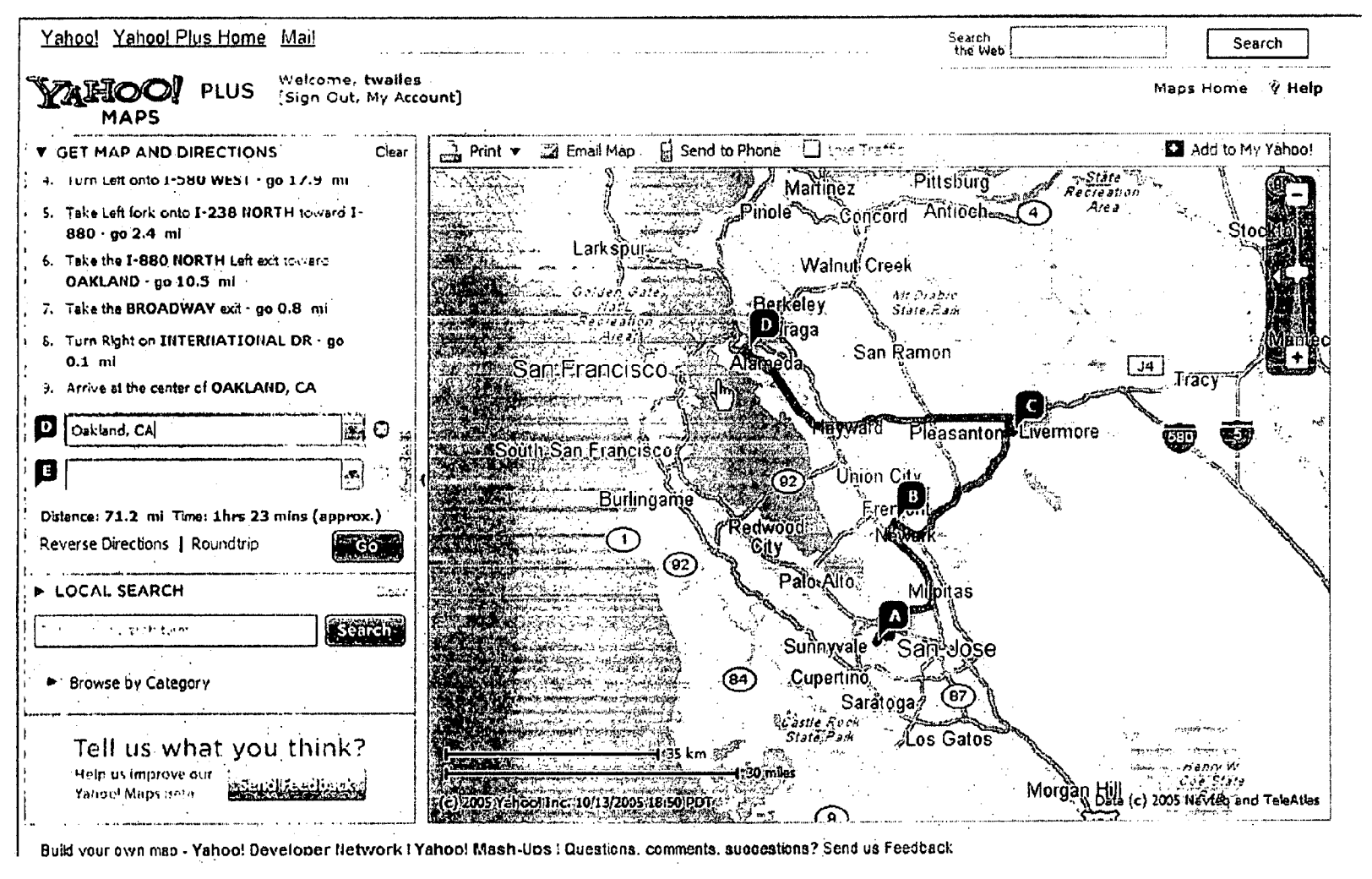

FIGS. 1a-1d illustrate a multipoint routing method according to embodiments of the present invention. FIG. 1a shows a user entering a first location at the location entry box A. FIG. 1b shows the user entering a second location at the location entry box B. Similarly, FIGS. 1c and 1d show the third and fourth locations are entered at locations entry boxes C and D respectively. Note that upon entering the second location at the location entry box B, the method automatically provides the next location entry box C for the user to enter additional locations, if any. This process is repeated for the subsequent entries, for example the fourth and fifth locations at location entry boxes D and E respectively.

As shown in FIGS. 1a-1d, the interactive mapping system affords a user the ability to create routes with multiple way-points. The user not only is able to create a route from one address/location (A) to another address/location (B), but also may have the option to continue his route to other addresses/locations, such as addresses/locations C, D, and beyond. The route steps between two way-points (e.g., A and B) are described in U.S. application Ser. No. 10/849,083, filed May 19, 2004, entitled "Mapping Method and System," and its continuation-in-part U.S. application Ser. No. 11/137,603, filed May 25, 2005, entitled "Mapping Method and System," both of which are incorporated herein by reference in their entirety.

Figure 2A:
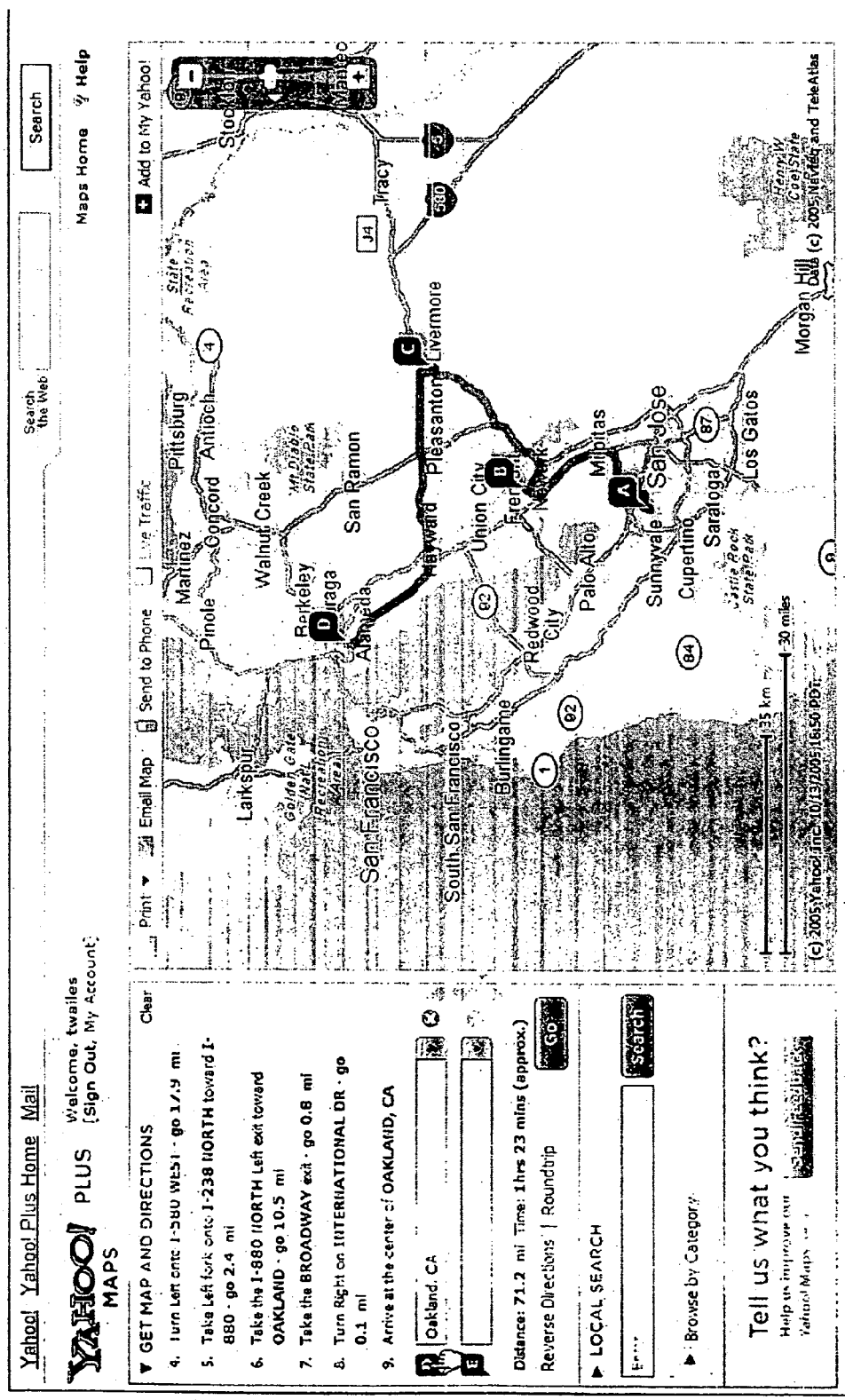
FIGS. 2a-2c illustrate re-ordering of destinations in the multipoint routing method according to embodiments of the present invention.
Figure 2B:
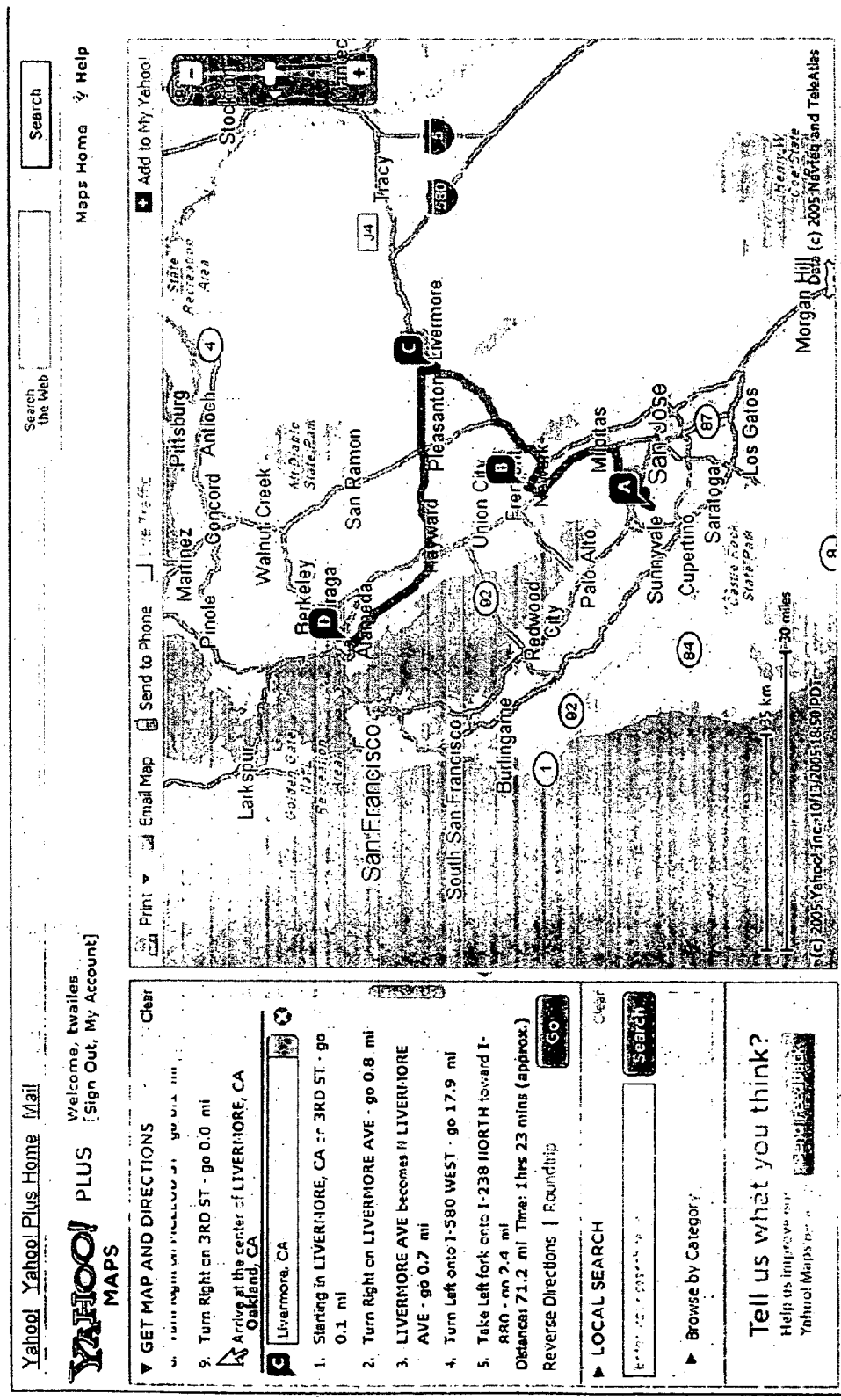
Figure 2C:
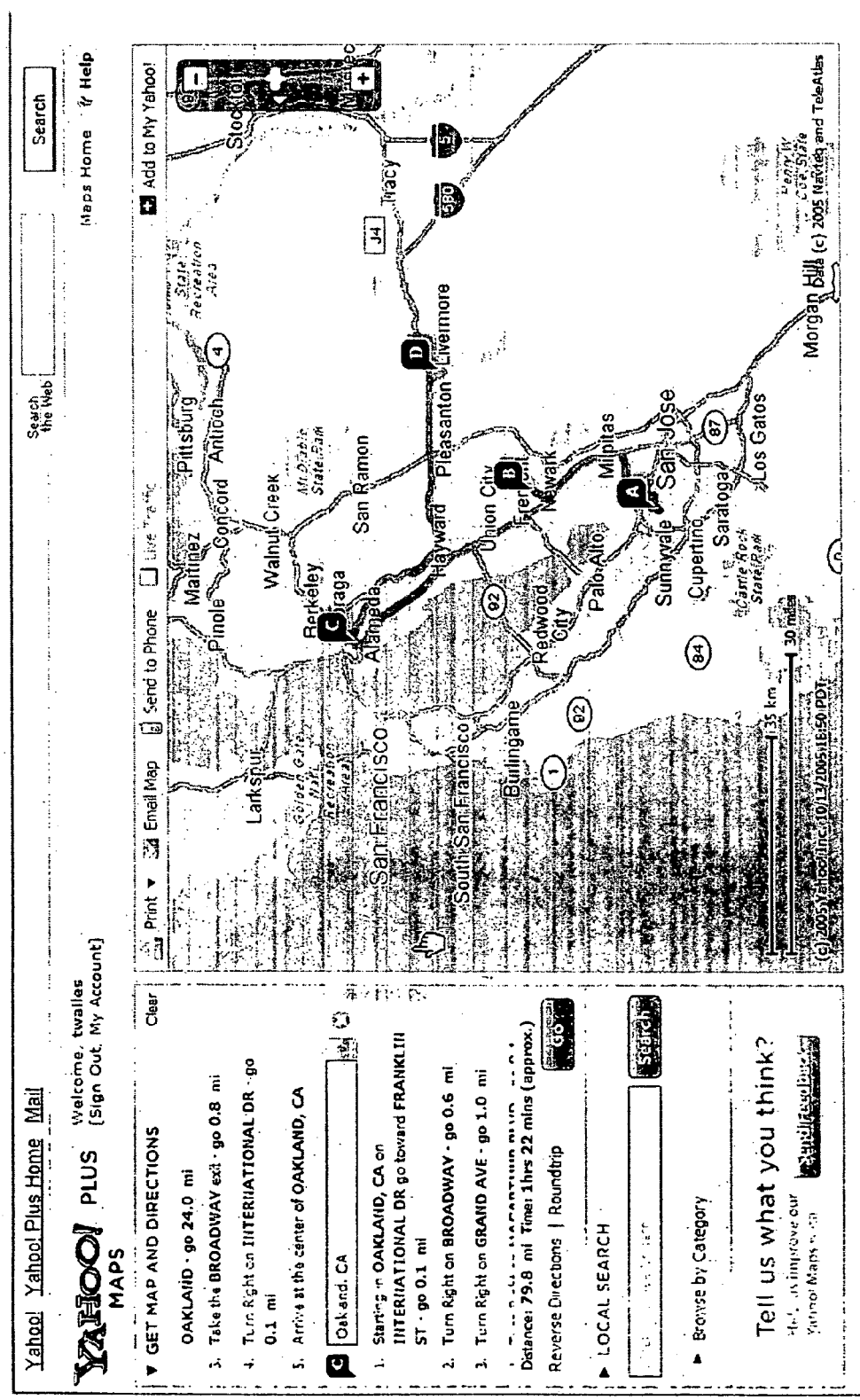

FIGS. 2a-2c illustrate re-ordering of destinations in the multipoint routing method according to embodiments of the present invention. FIG. 2a shows the user (cursor shown as a hand) grabbing the D point to be moved to in front of the C point (Livermore) in the route. FIG. 2b shows the D point (Oakland) being dragged and inserted prior to the C point (Livermore). FIG. 2c shows the new C point (Oakland) both in the map and directions list and in the route drawn on the map. The previous C point (Livermore) becomes the new D point.

As shown in FIGS. 2a-2c, the user may re-order way-points within his route by dragging and dropping within the list view of the route or by dragging a way-point from the map view into the desired point in the list view. For example, the user may decide to change way-point D to be the first stop, so he can drag that point and drop it before the current B way-point in the route list view, and it becomes the new B way-point. The previous B way-point is displaced and becomes the new C way-point and so on. The route steps description and representation on the map are refreshed to describe and show the new route.

Figure 3A:
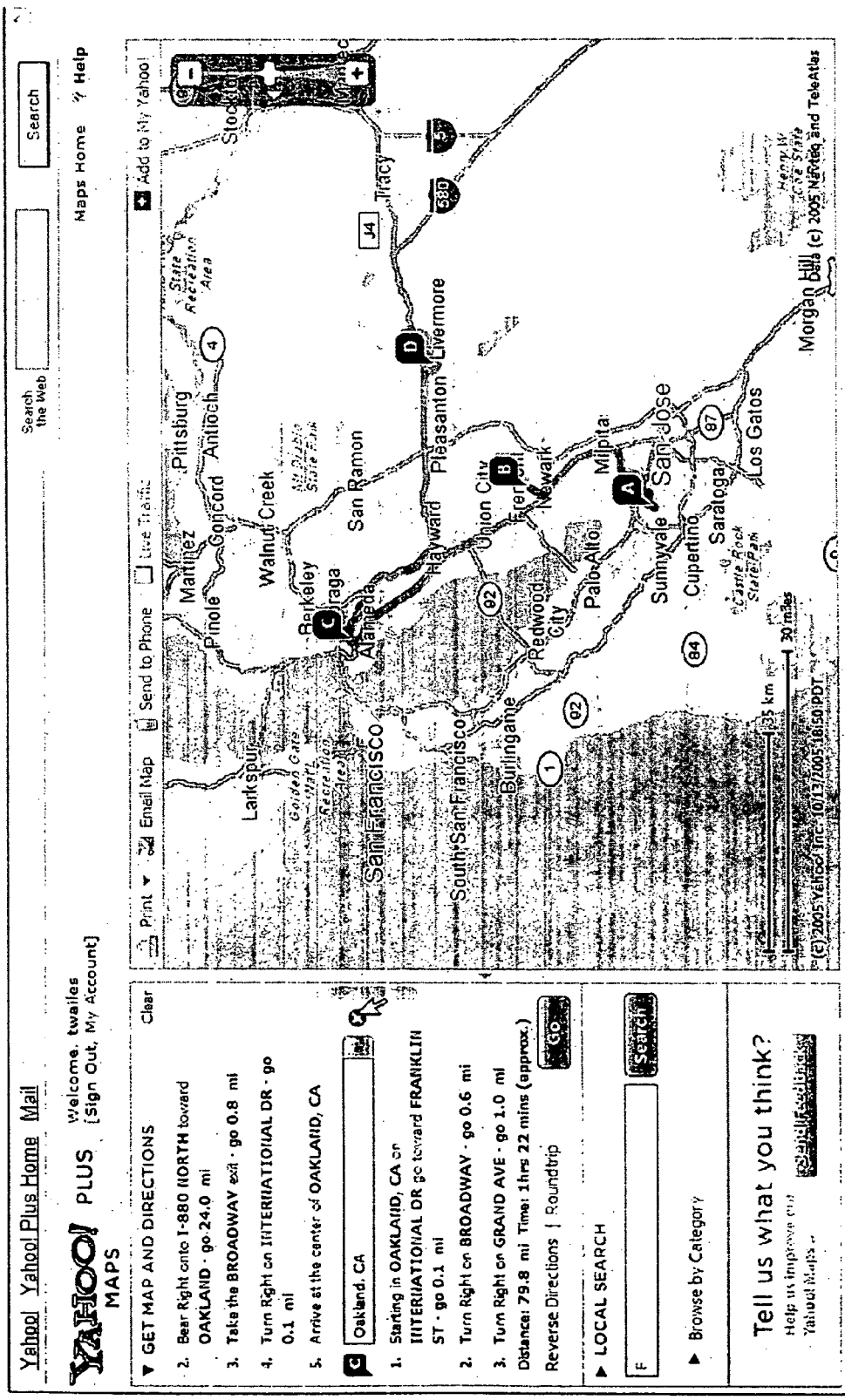
FIGS. 3a-3b illustrate removing a destination in the multipoint routing method according to embodiments of the present invention.
Figure 3B:
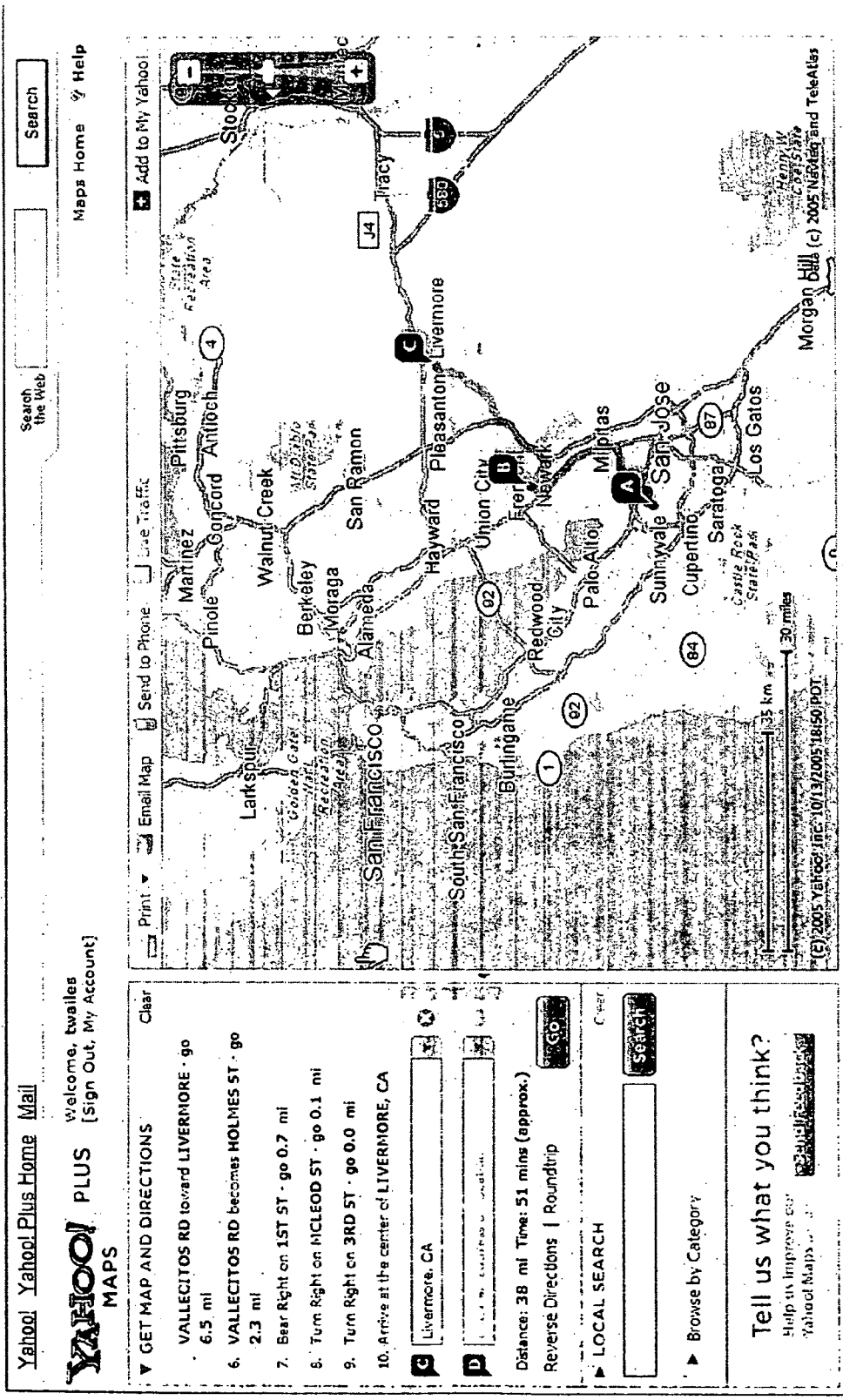

FIGS. 3a-3b illustrate removing of a destination in the multipoint routing method according to embodiments of the present invention.

FIGS. 3a-3b show the user may delete one or more way-points from his route. For example, the user may remove way-point B from a route that has way-points A-B-C-D. After way-point B is removed, way-point C becomes the new B way-point, and D becomes the new C way-point. In FIG. 3a, the delete icon at the right-side of way-point C is selected. After the way-point C (Oakland) is deleted, the original way-point D (Livermore) becomes the new way-point C as shown in FIG. 3b.

Figure 4A:
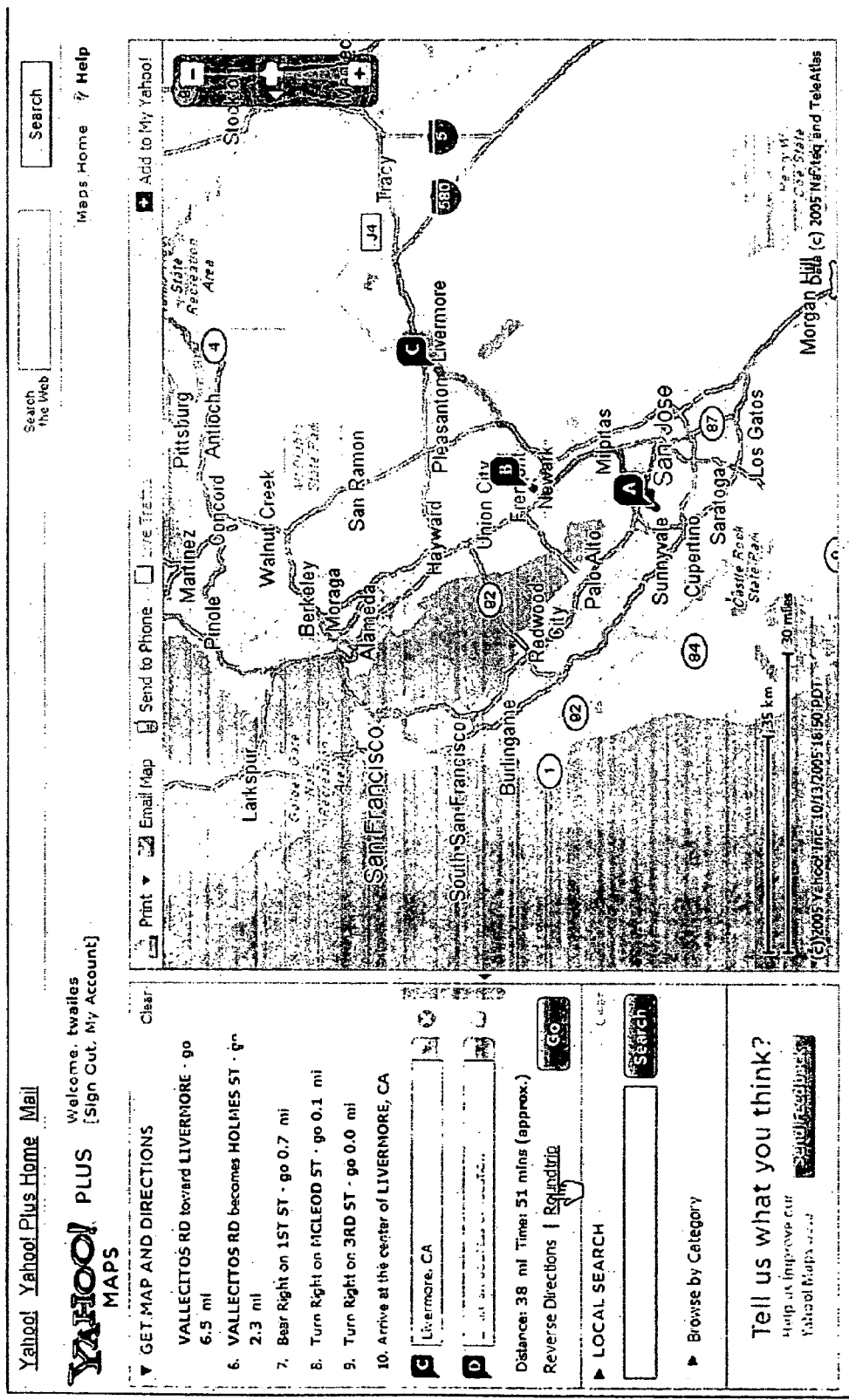
FIGS. 4a-4b illustrate creating a roundtrip in the multipoint routing method according to embodiments of the present invention.
Figure 4B:
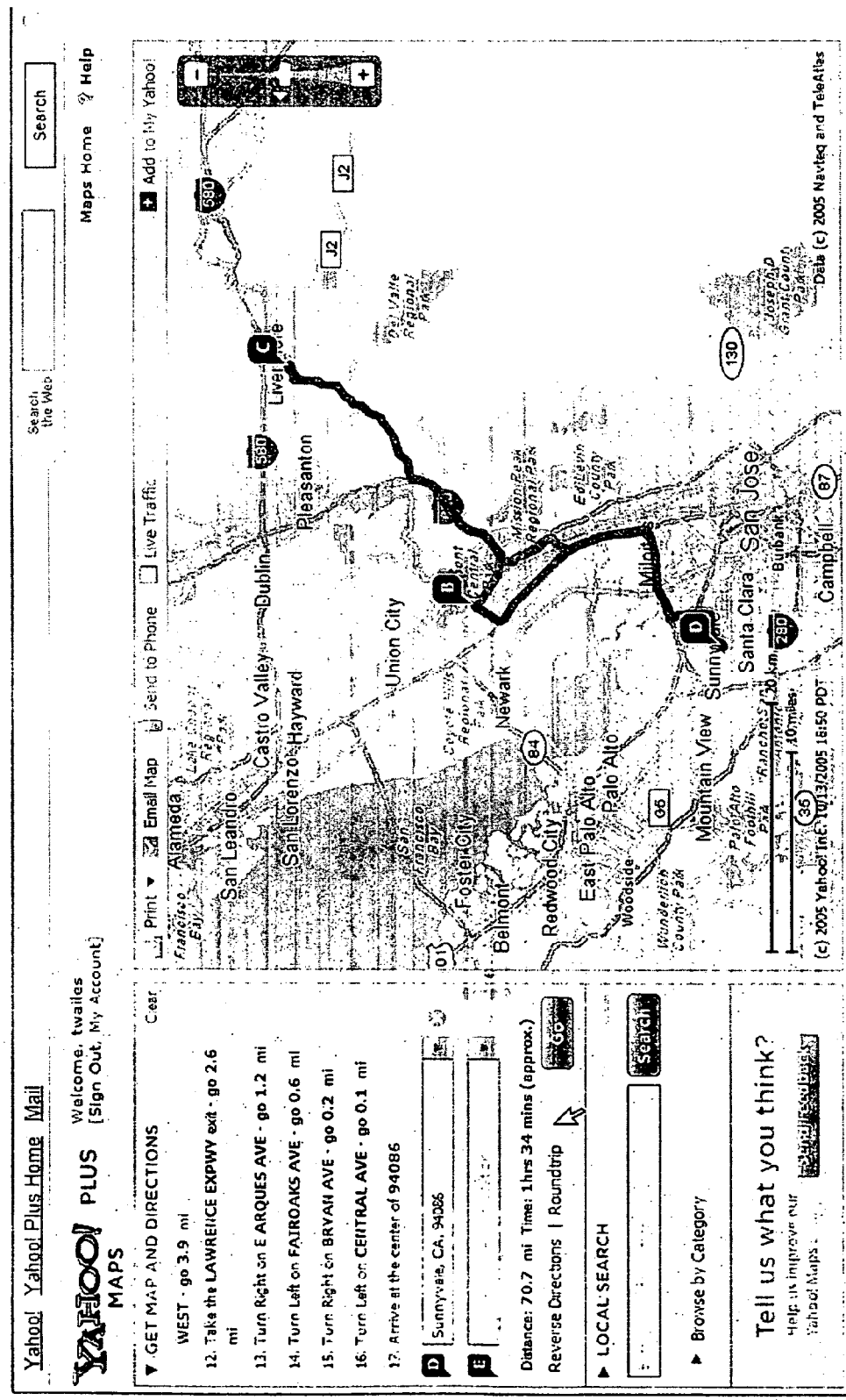

FIGS. 4a-4b illustrate creating a roundtrip in the multipoint routing method according to embodiments of the present invention. This is done by selecting the Roundtrip link as indicated by the cursor (hand) in FIG. 4a. The user may create a multipoint route by drag and drop of local entities (e.g., businesses) represented on the map from the map to the desired position within the route list view. FIG. 4b shows the complete roundtrip both on the map and on the directions list. As a result, the total distance of the trip is increased to 70.7 miles (the sum of the distance of each of the two routes), and the amount of time is increased to one hour and thirty four minutes (the sum of the time of each of the two routes).

Figure 5A:
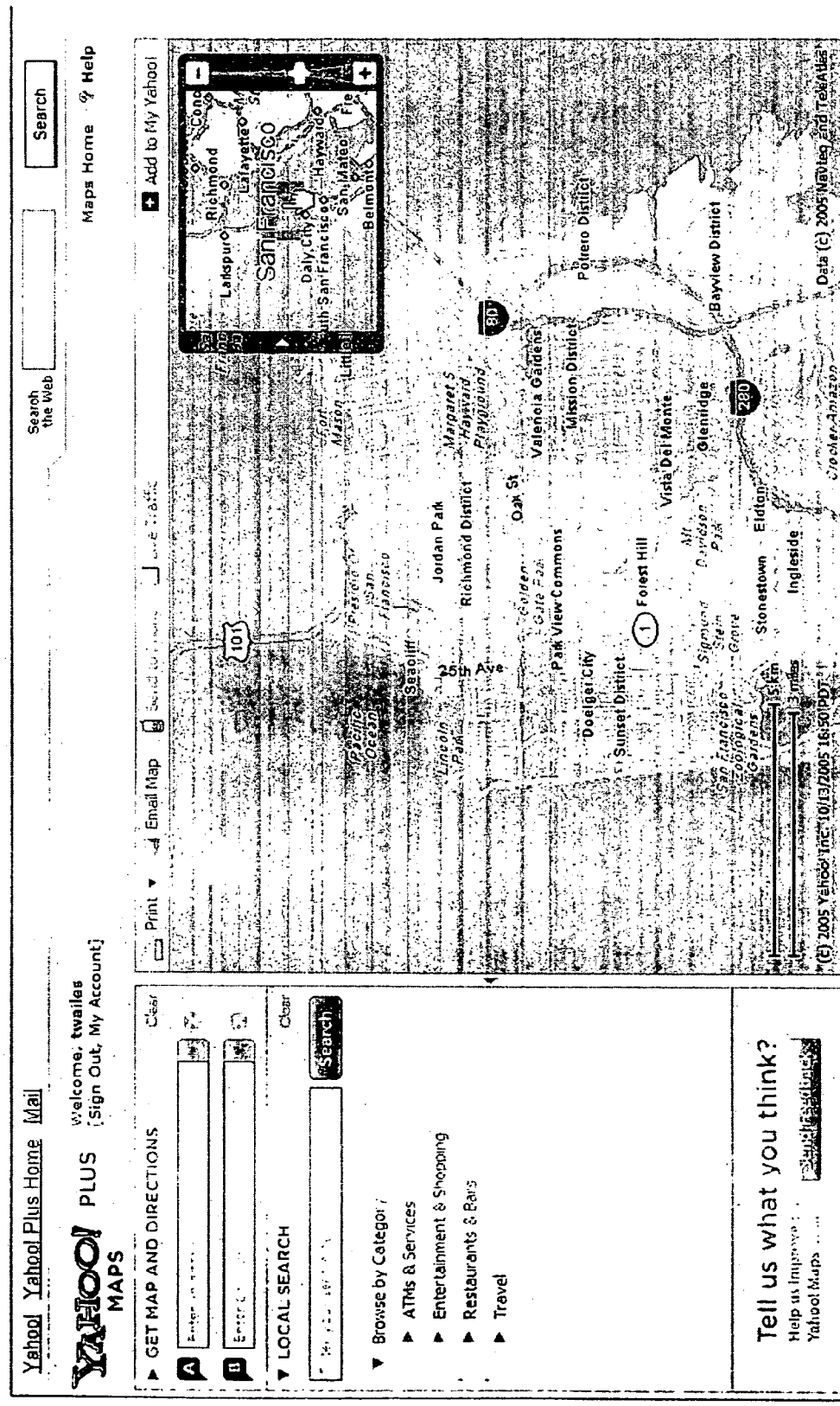
FIGS. 5a-5e illustrate a map navigator according to embodiments of the present invention.

FIGS. 5a-5e illustrate a map navigator according to embodiments of the present invention. A map navigator includes a small map that gives the surrounding geographic context of the large map view. Within the map navigator, the extent of the current large map view is represented by a shaded rectangular driving (panning) control super-imposed on the surrounding geographic context map, as shown in FIG. 5a. For example, while the large map may show the City of San Francisco, the map navigator map shows the Bay Area with a shaded rectangular area representing San Francisco.

Figure 5B:
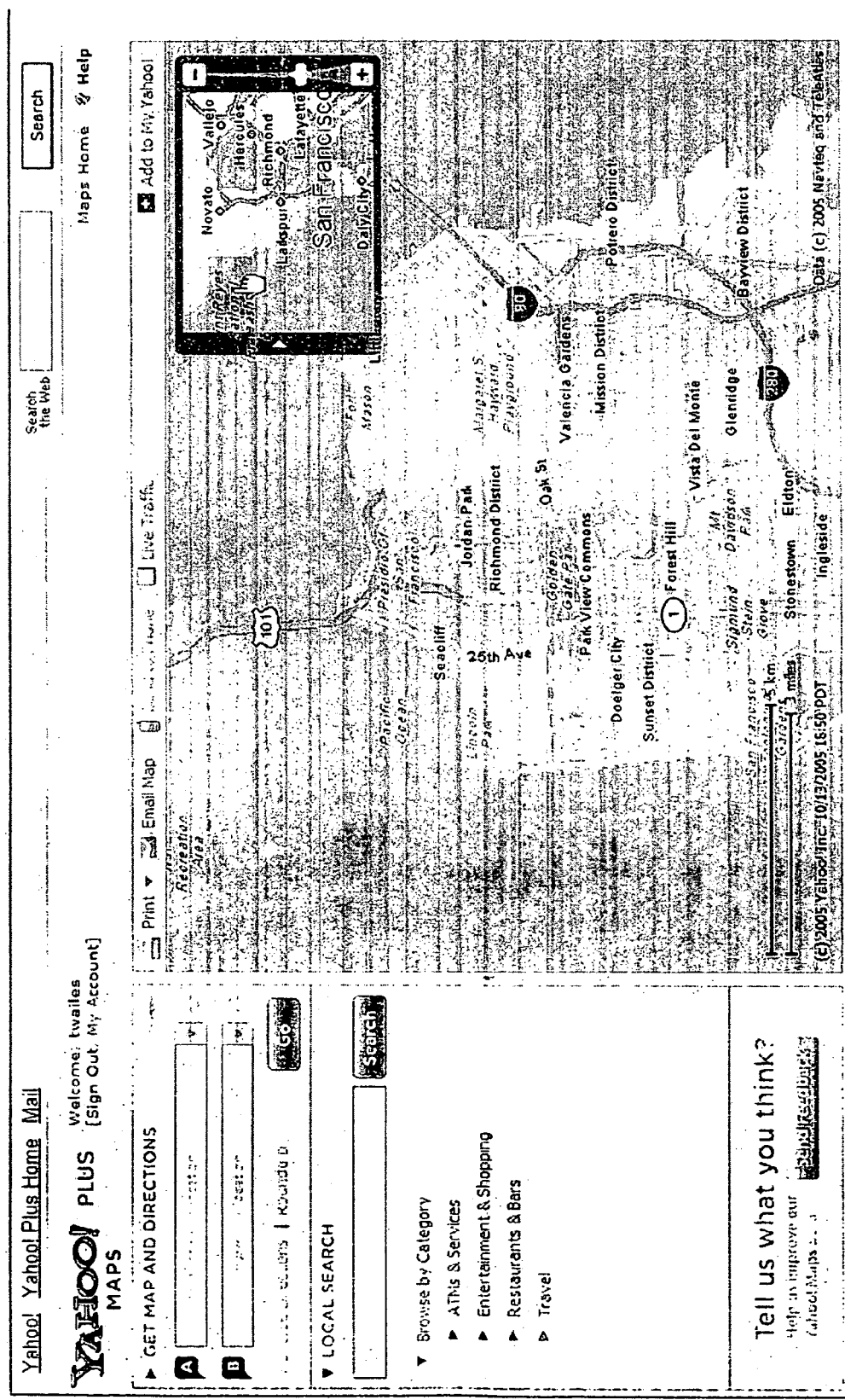
Figure 5C:
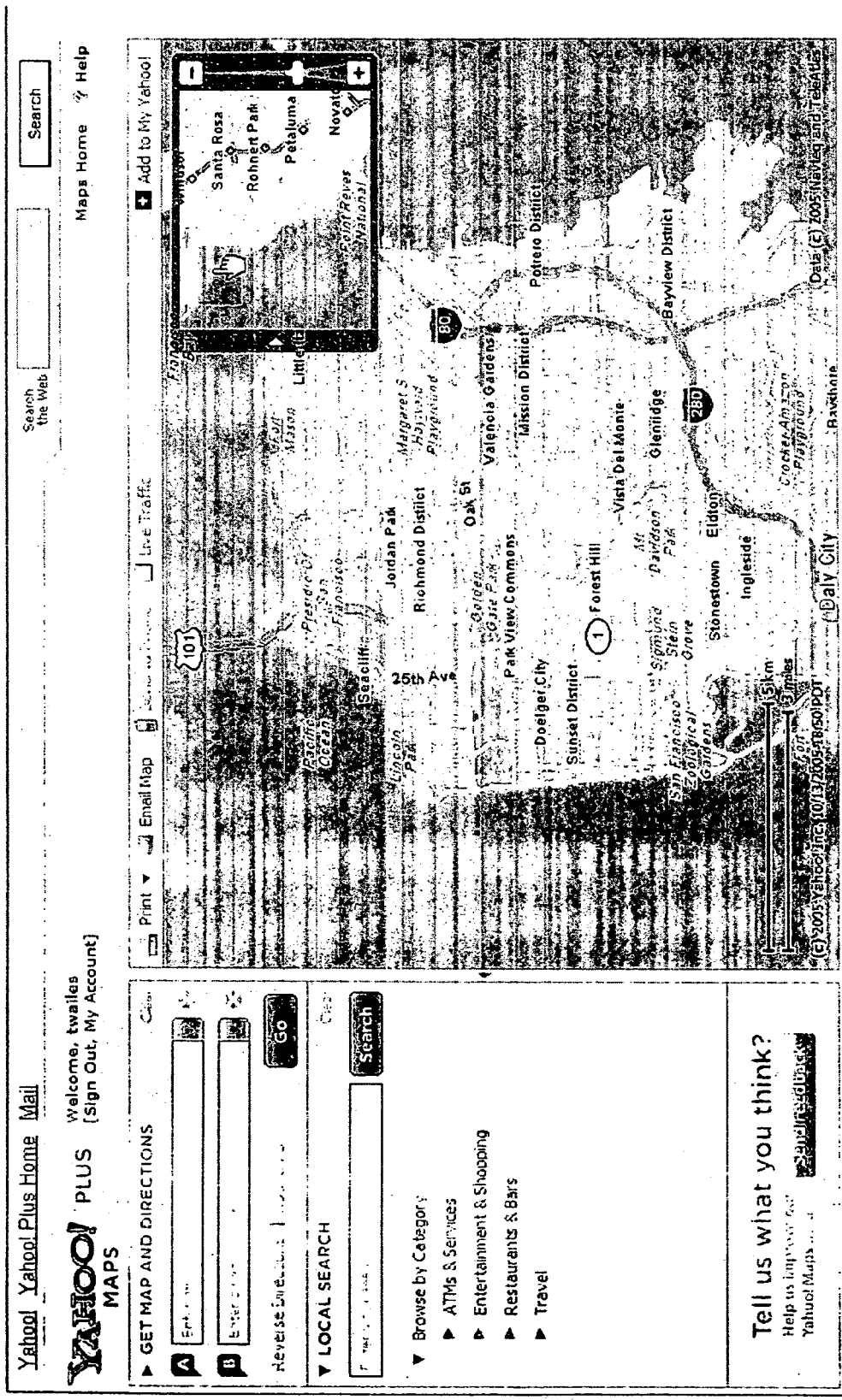
Figure 5D:
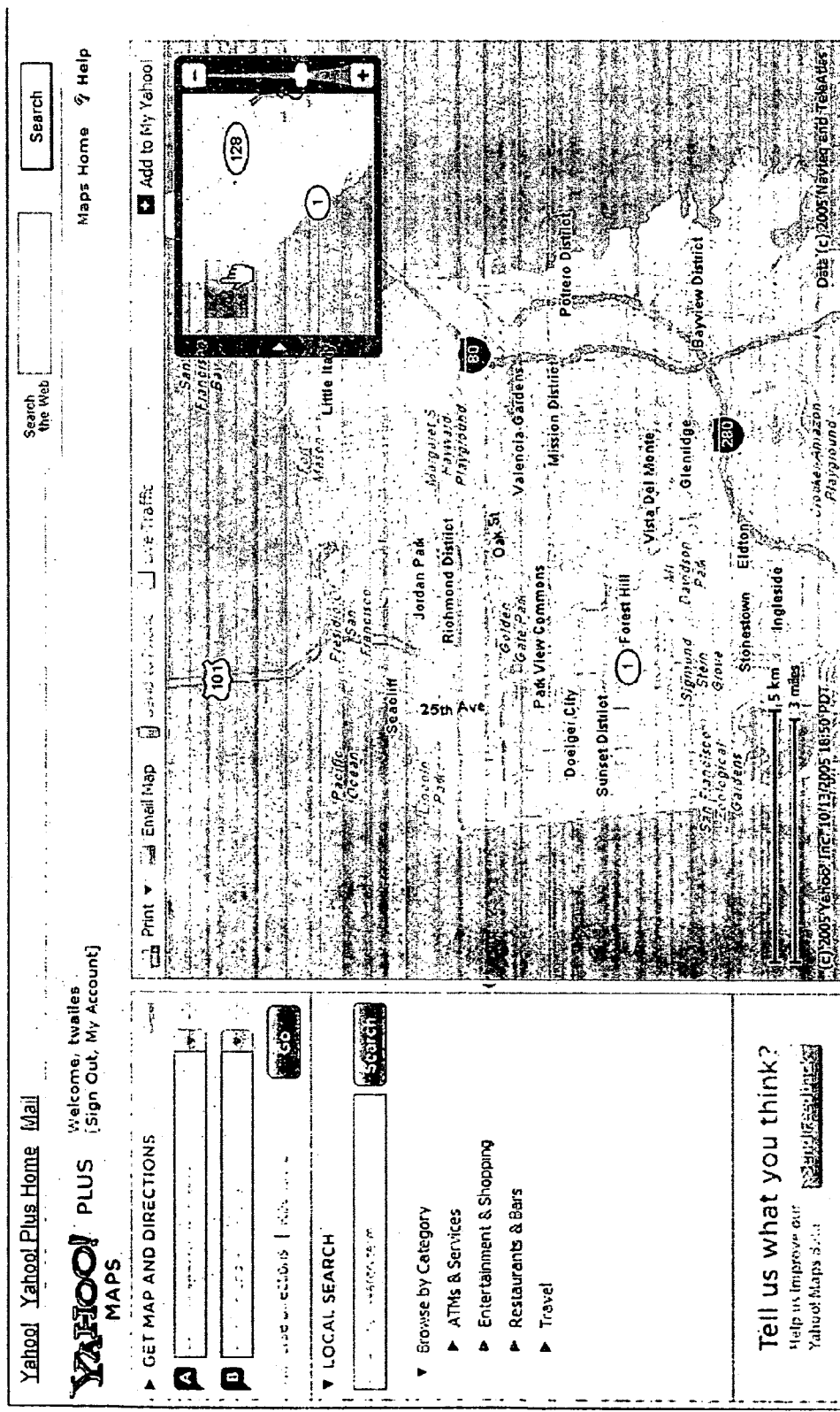
Figure 5E:
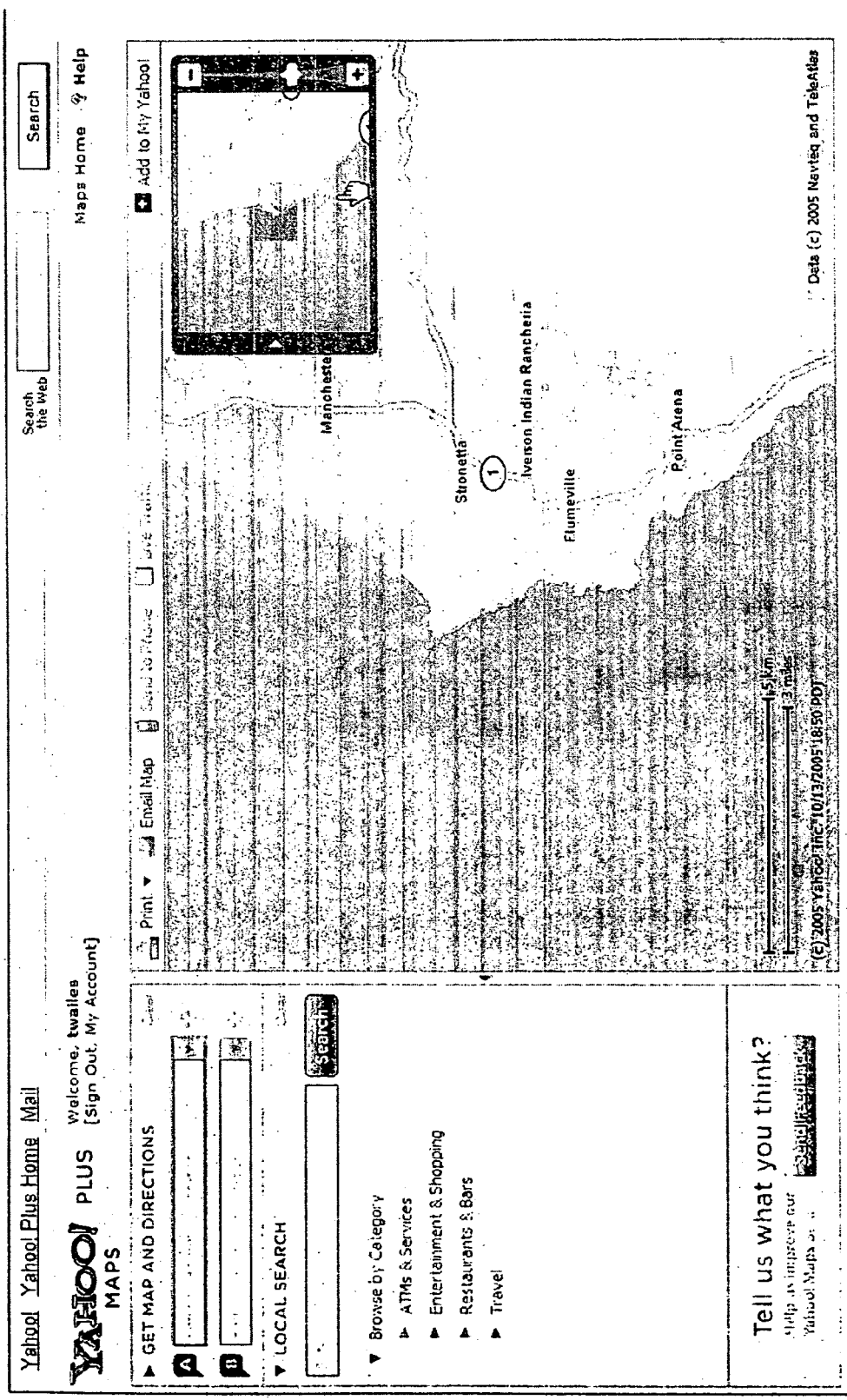

The user can use this shaded area as a control to "drive" to other locations and so explore the geographic context of the current map. As shown in FIG. 5b, this is done by dragging the driving control (shown as the cursor over the grey box) in the direction he wants to drive. In FIG. 5c, the map navigator continuously pans in the direction the user is moving the panning control for as long as the user continues to hold and drag it. In FIG. 5d, the user releases the panning control, and in FIG. 5e, the driving control then settles on the center of the map navigator area, and the large map redraws to the new location the user just drove to.

Figure 6:
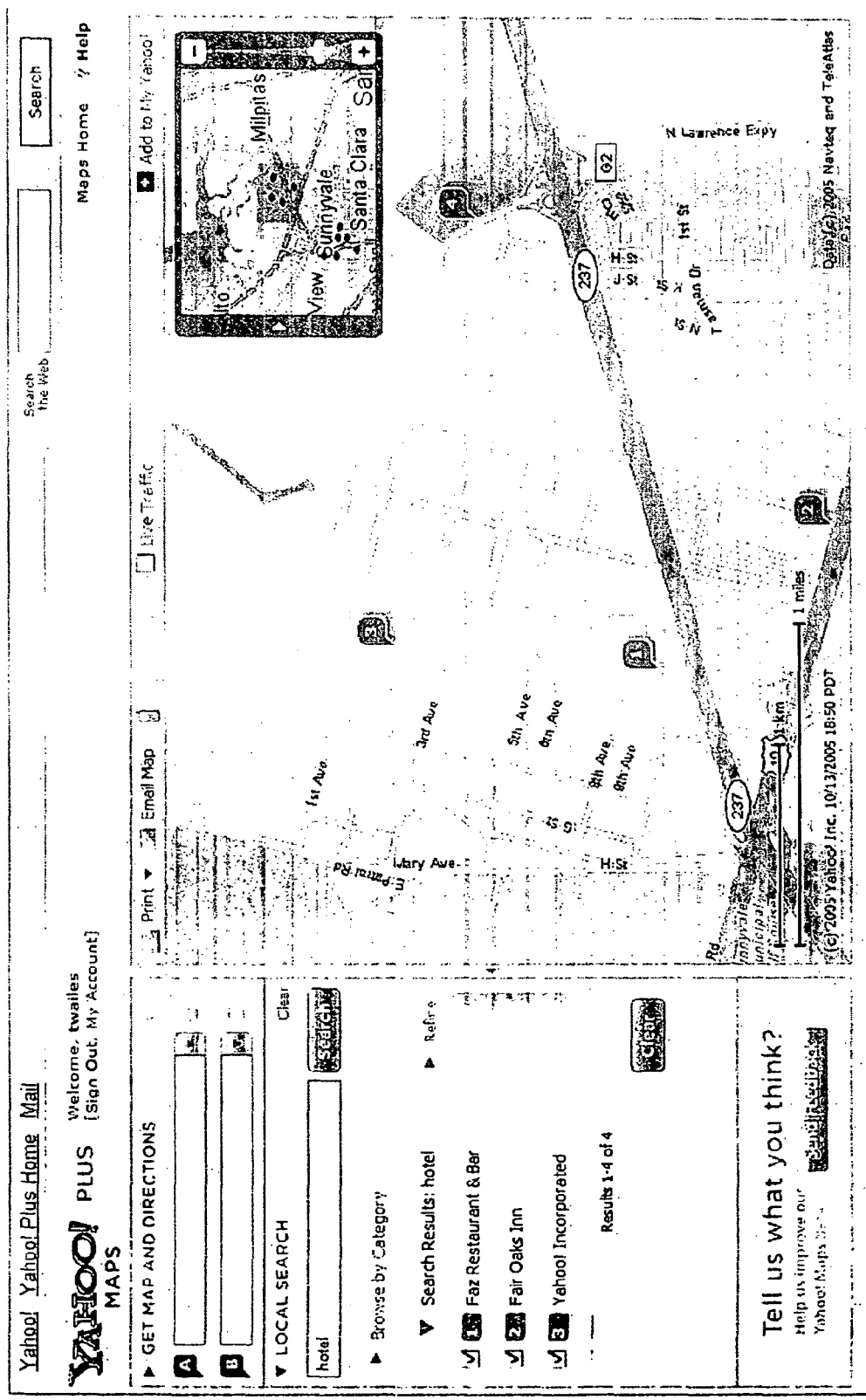
FIG. 6 illustrates result clusters associated with the map navigator according to embodiments of the present invention.

FIG. 6 illustrates result clusters associated with the map navigator according to embodiments of the present invention. The map navigator may also show representations of data points of interest, for example, businesses such as cafes, hotels, or restaurants. While the large map may only show, say, three points of interest, the map navigator is able to display representations of further similar points of interest in geographic areas adjacent to the view shown by the large map. This allows the user to quickly see and navigate to areas outside the large map view that may contain data of interest. For example, the large map only shows three hotels, but the map navigator shows a cluster of six more to the southwest. Other data of interest such as routes, traffic, demographic statistics, and any other geo-data may be similarly represented.

Figure 7A:
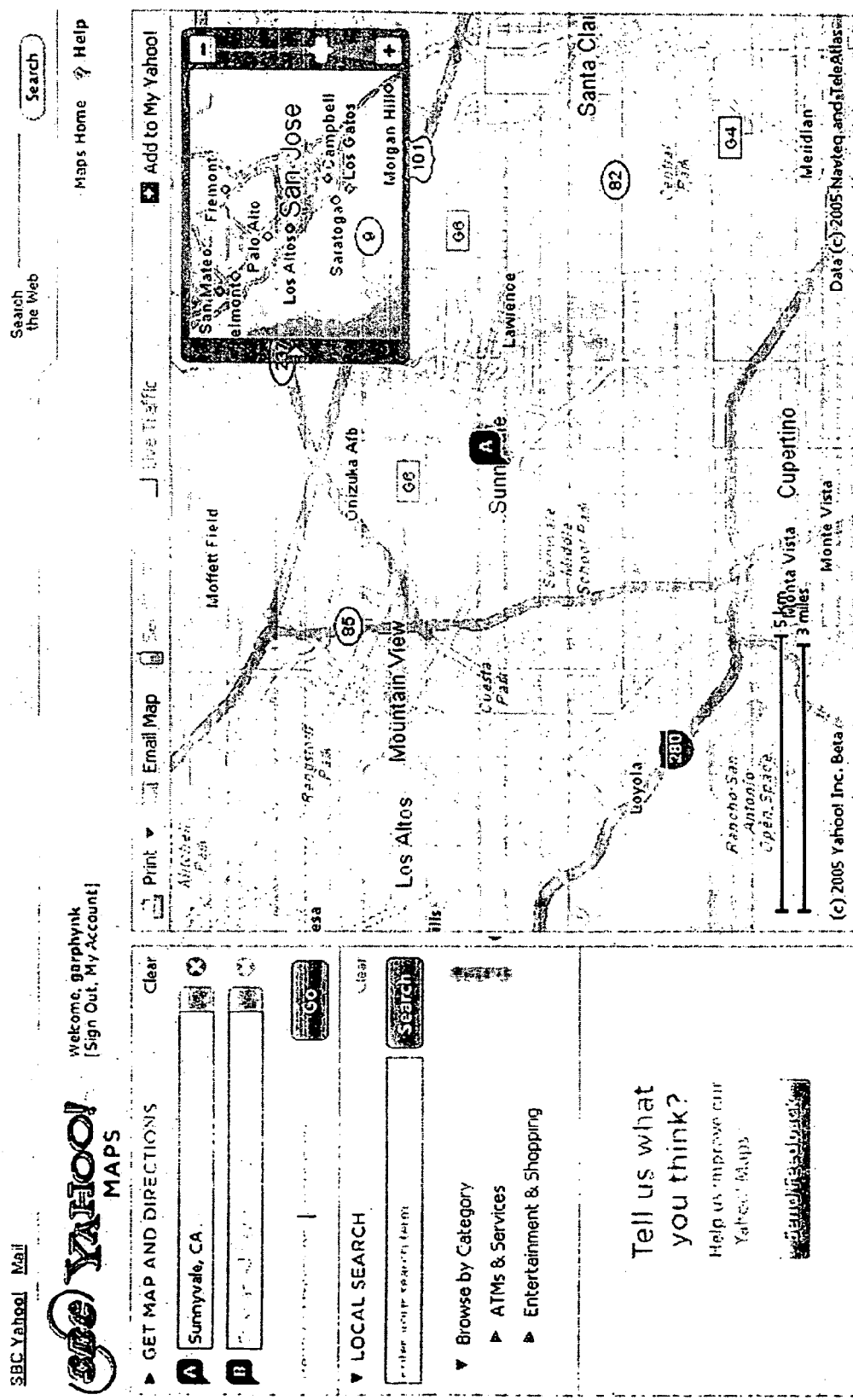
FIGS. 7a-7b illustrate aspect ratio of the map navigator according to embodiments of the present invention.
Figure 7B:
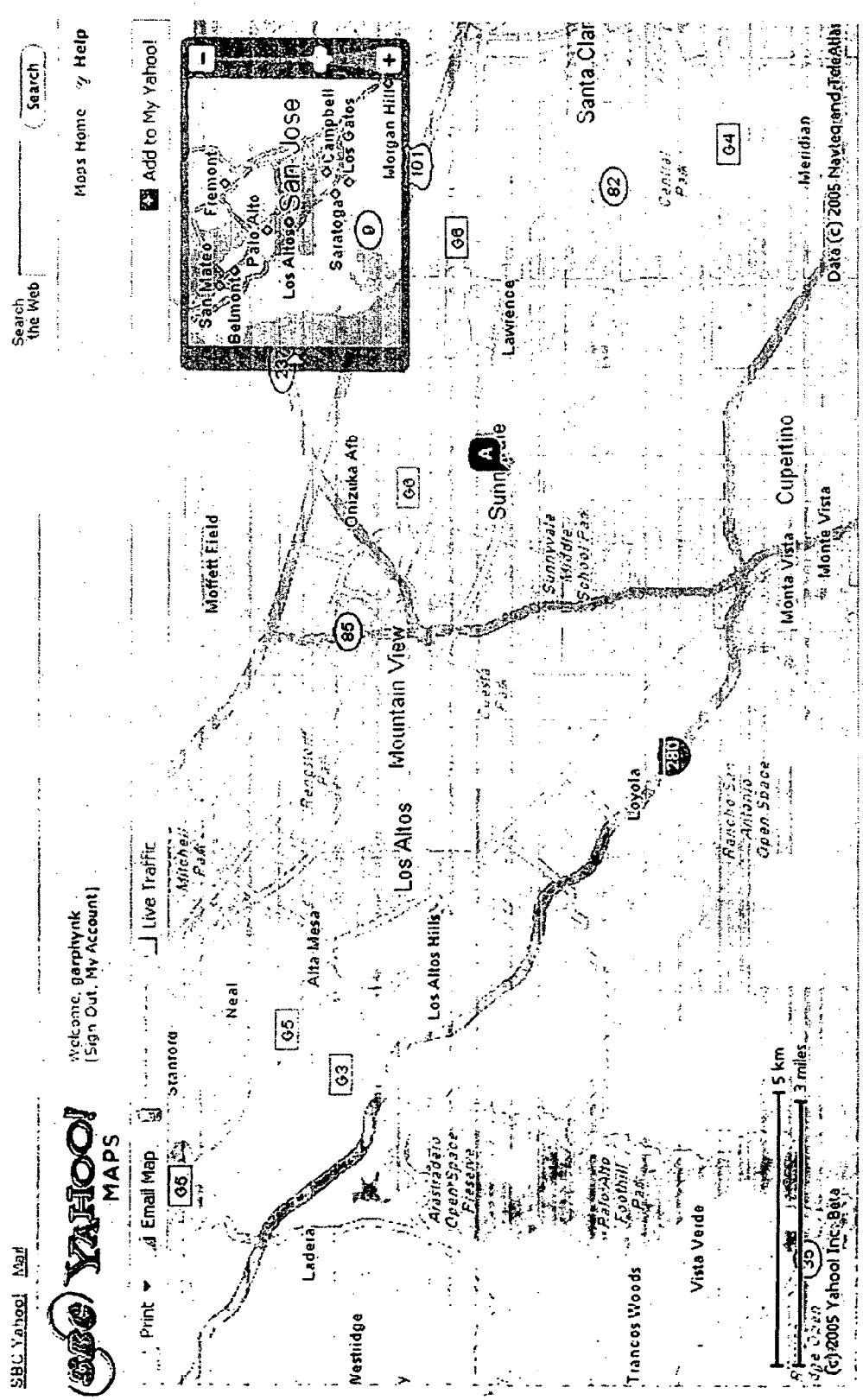

FIGS. 7a-7b illustrate aspect ratio of the map navigator according to embodiments of the present invention. FIG. 7a shows a default view of the map navigator, which has substantially the same aspect ratio as the main map. FIG. 7b shows an all-map view of the map navigator, which also has substantially the same aspect ratio as the main map. Note that the aspect ratio of the driving control corresponds to that of the large map, such that it changes due to the browser window re-sizing or the closing of the control panel.

Figure 8A:
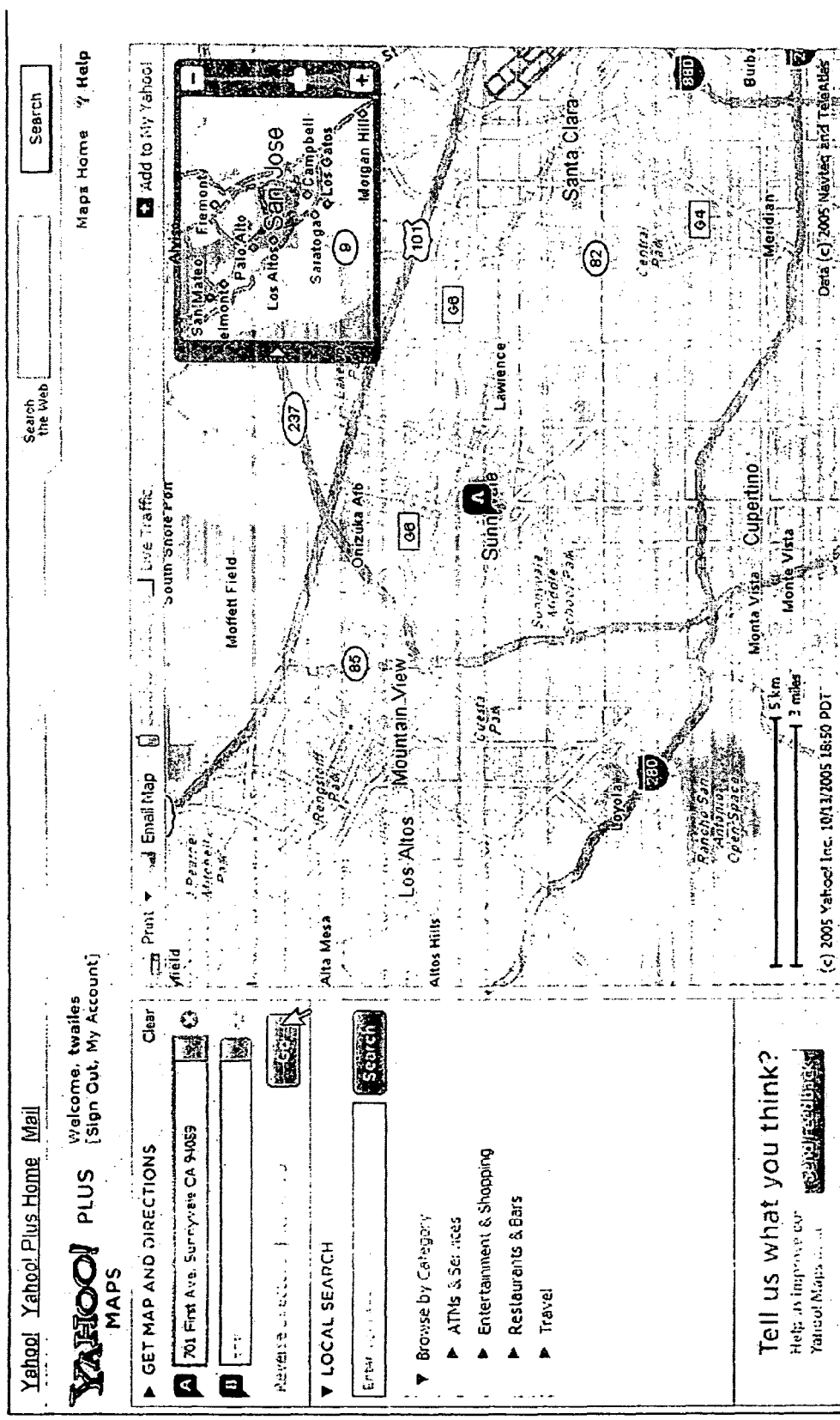
Figure 8B:
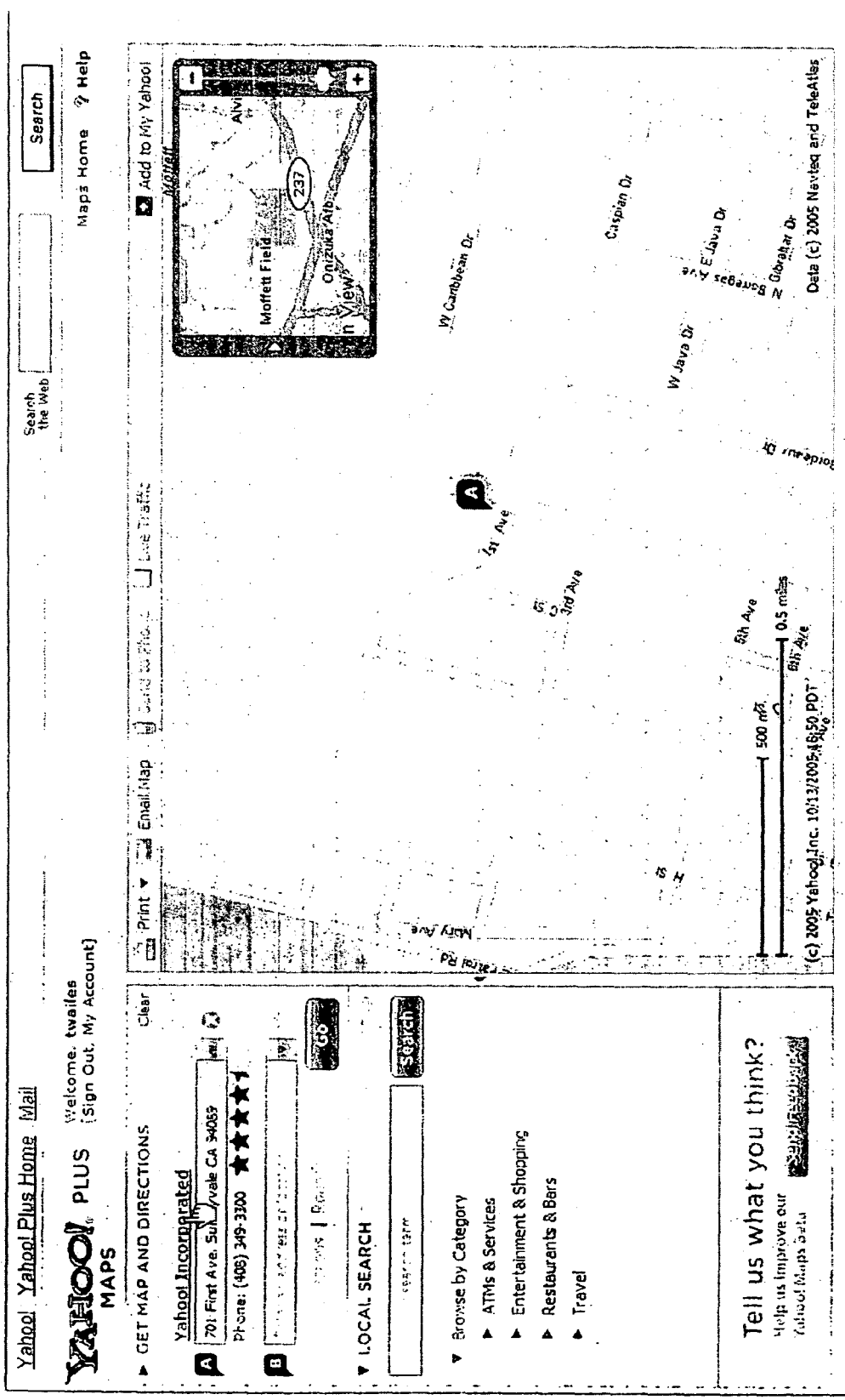

FIGS. 8a-8c illustrate an address-to-business lookup method according to embodiments of the present invention. The interactive mapping system matches an address entered into a location field with a known business. For example as shown in FIG. 8a, a user may enter "701 First Ave, Sunnyvale Calif. 94089" into location field A, and upon submission of this entry, the system returns a match for the business known to be at this address, as shown in FIG. 8b as Yahoo! Incorporated. Additional information about that business may then be displayed, such as the phone number, user ratings (stars) of the business, etc. The user may access further information about this business by linking to supplementary pages shown in FIG. 8c, which may include user reviews, photos, hours of operation, and other relevant information.

Figure 9A:
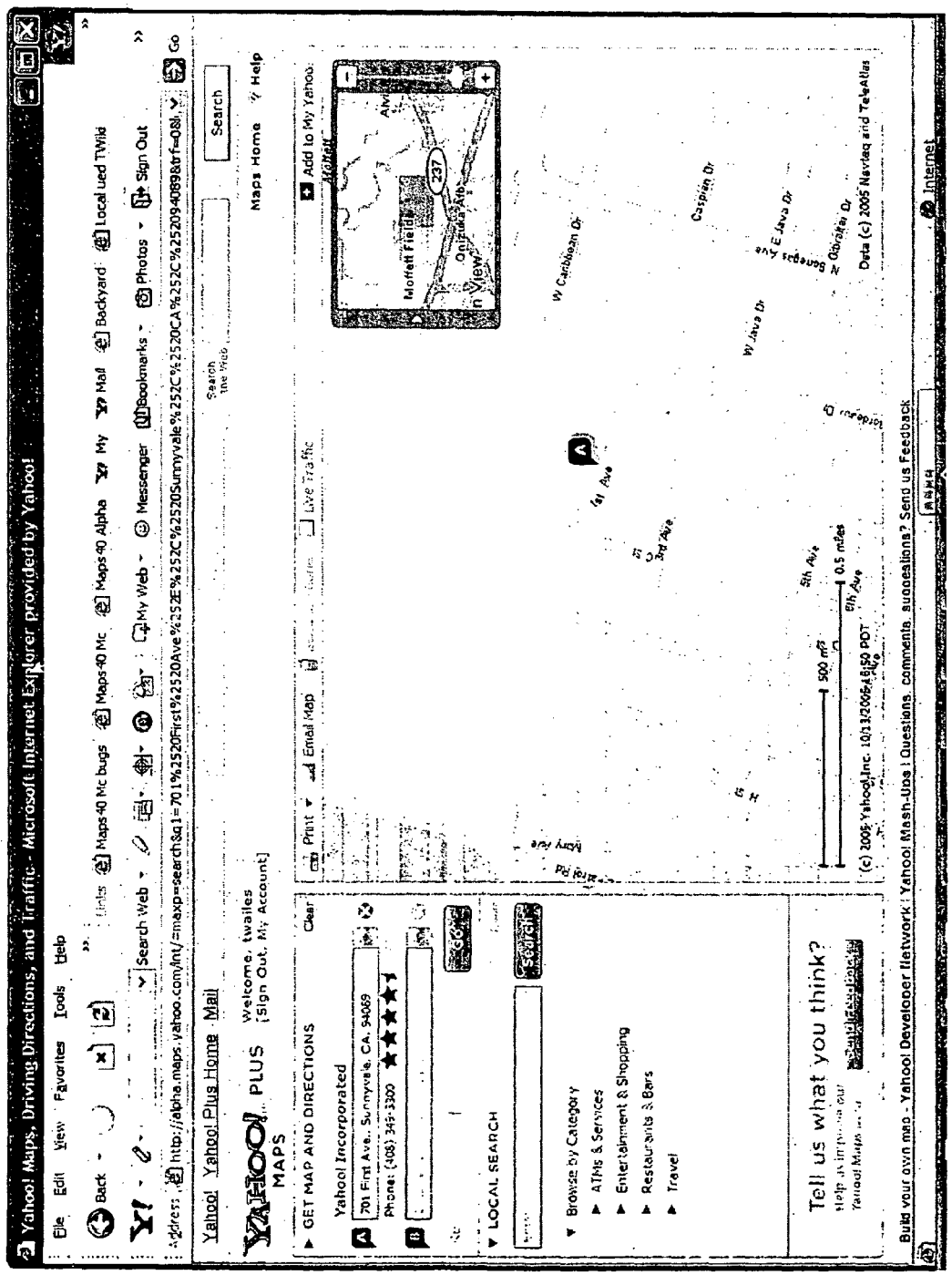
FIGS. 9a-9c illustrate a method for updating an address in the uniform resource locator (URL) according to embodiments of the present invention.
Figure 9B:
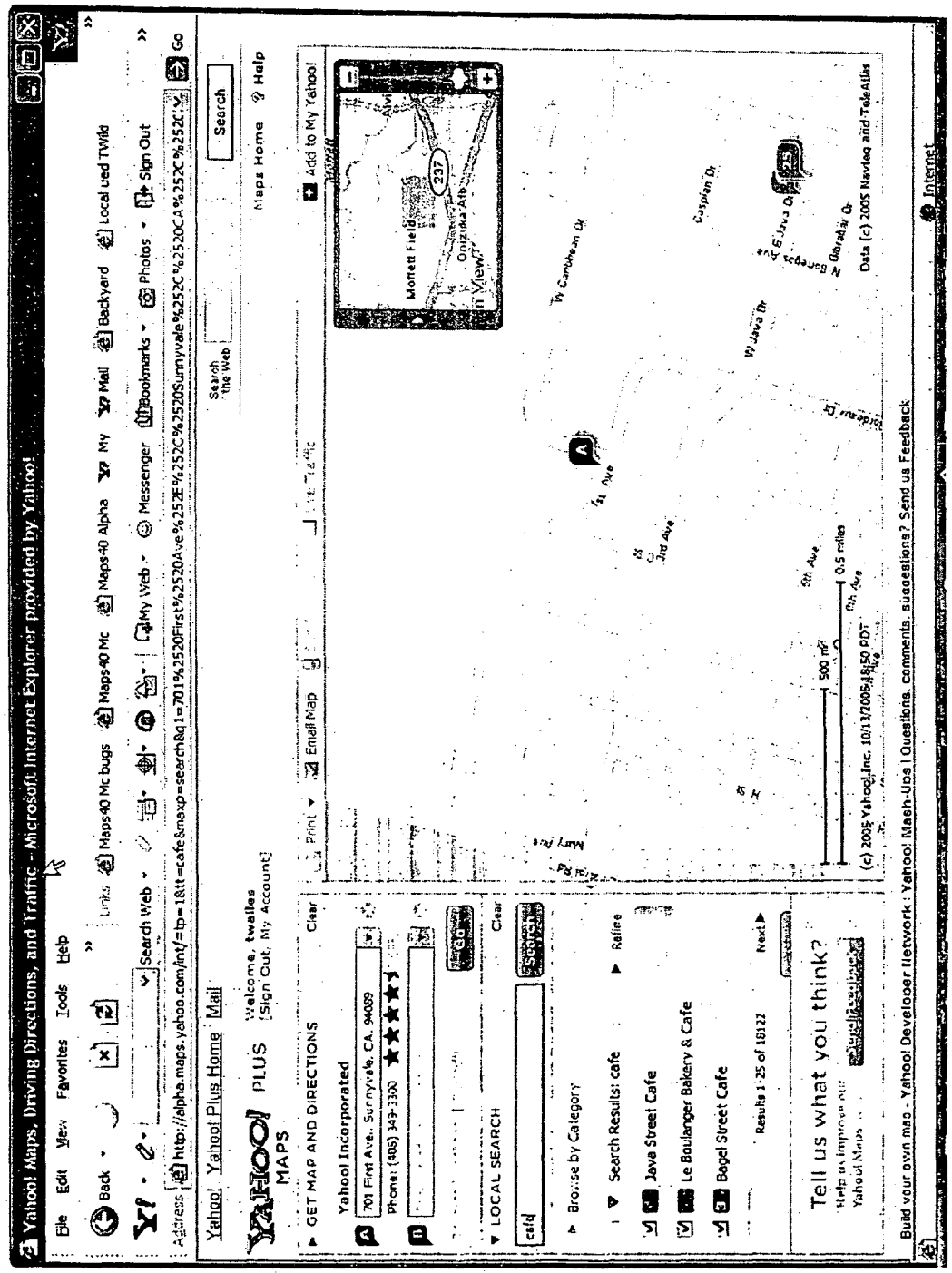
Figure 9C:
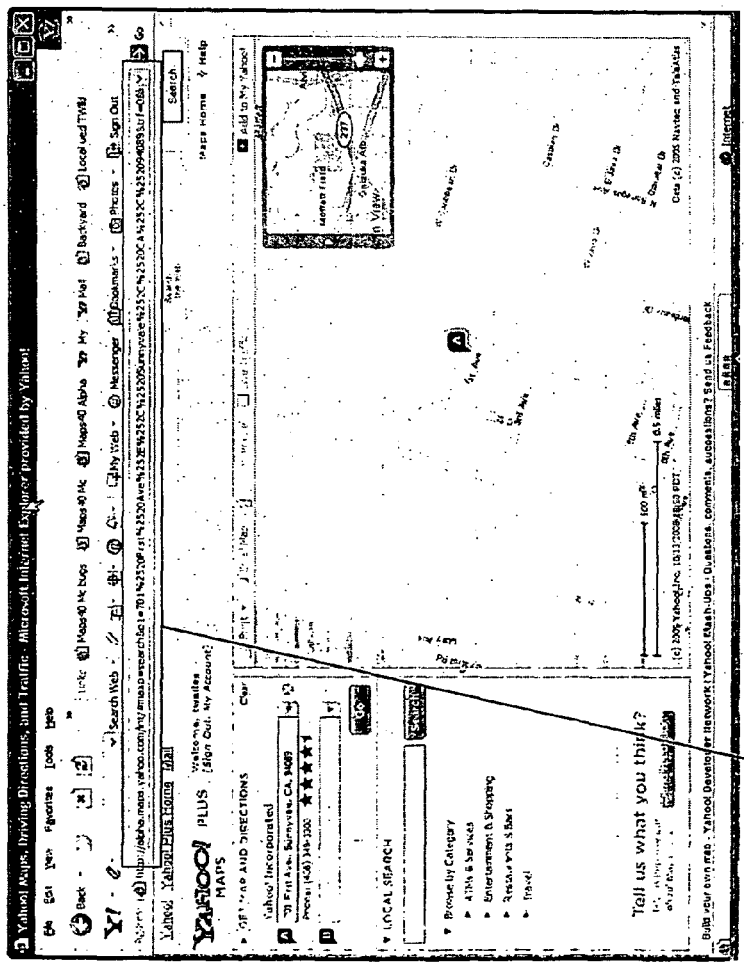

FIGS. 9a-9c illustrate a method for updating an address in the URL according to embodiments of the present invention. The interactive mapping system automatically updates the URL in the browser address bar in real time. This URL contains sufficient information to allow for the redrawing of the current map view, including any data superimposed on it, such as driving directions, points of interest, etc. For example, instead of using the # symbol to designate in-page anchor links, the system designates the # symbol with a query string that describes the contents of the page (e.g., search results and other map zoom levels etc.). This is represented by the text after the "#" near the middle of the first line in the example shown in FIG. 9c. This function allows the user to copy and paste the URL of the current view, and email it to a friend who may then link to this exact view.

Figure 10A:
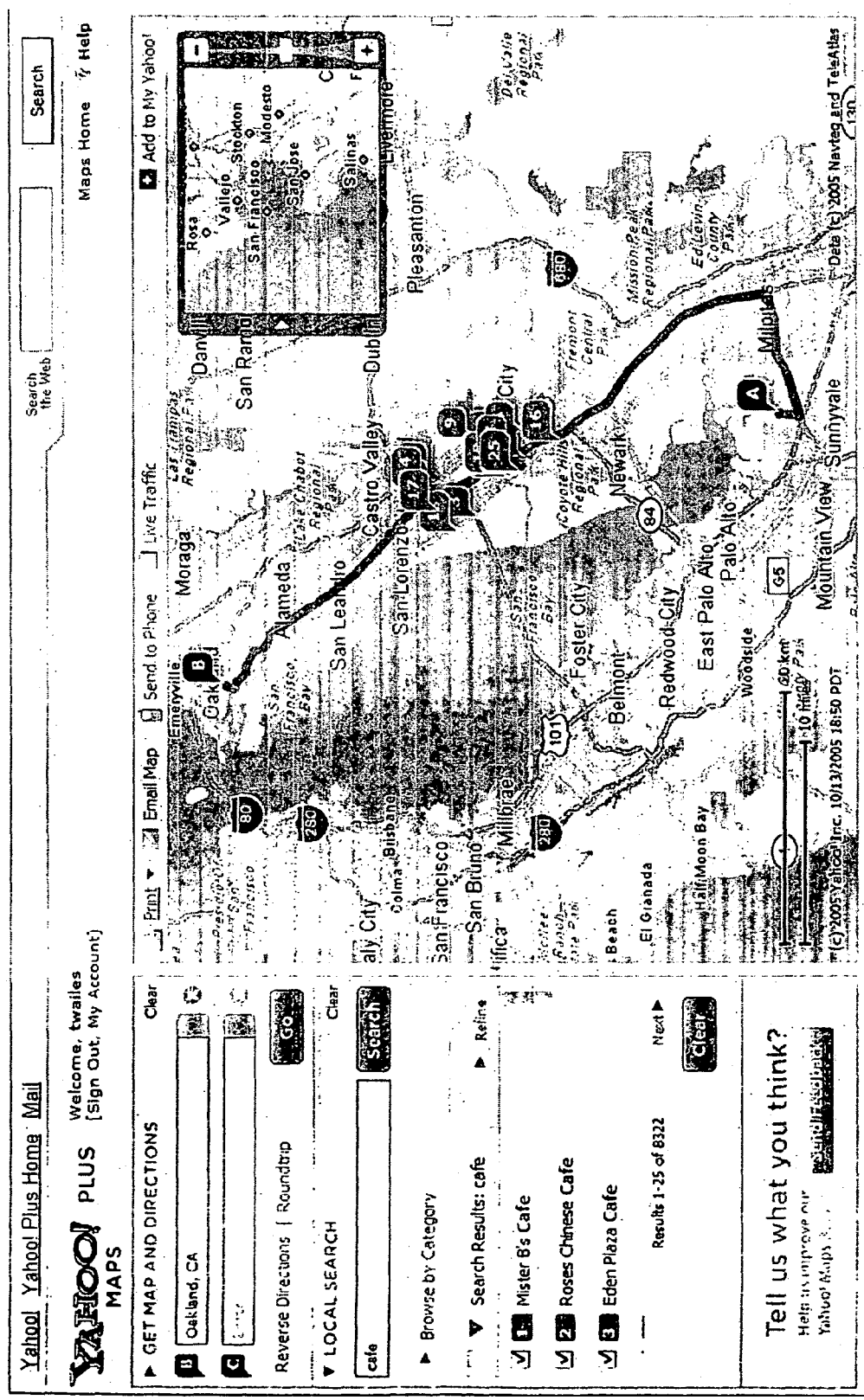
FIGS. 10a-10c illustrate a method for printing a map with directions and search results according to embodiments of the present invention.
Figure 10B:
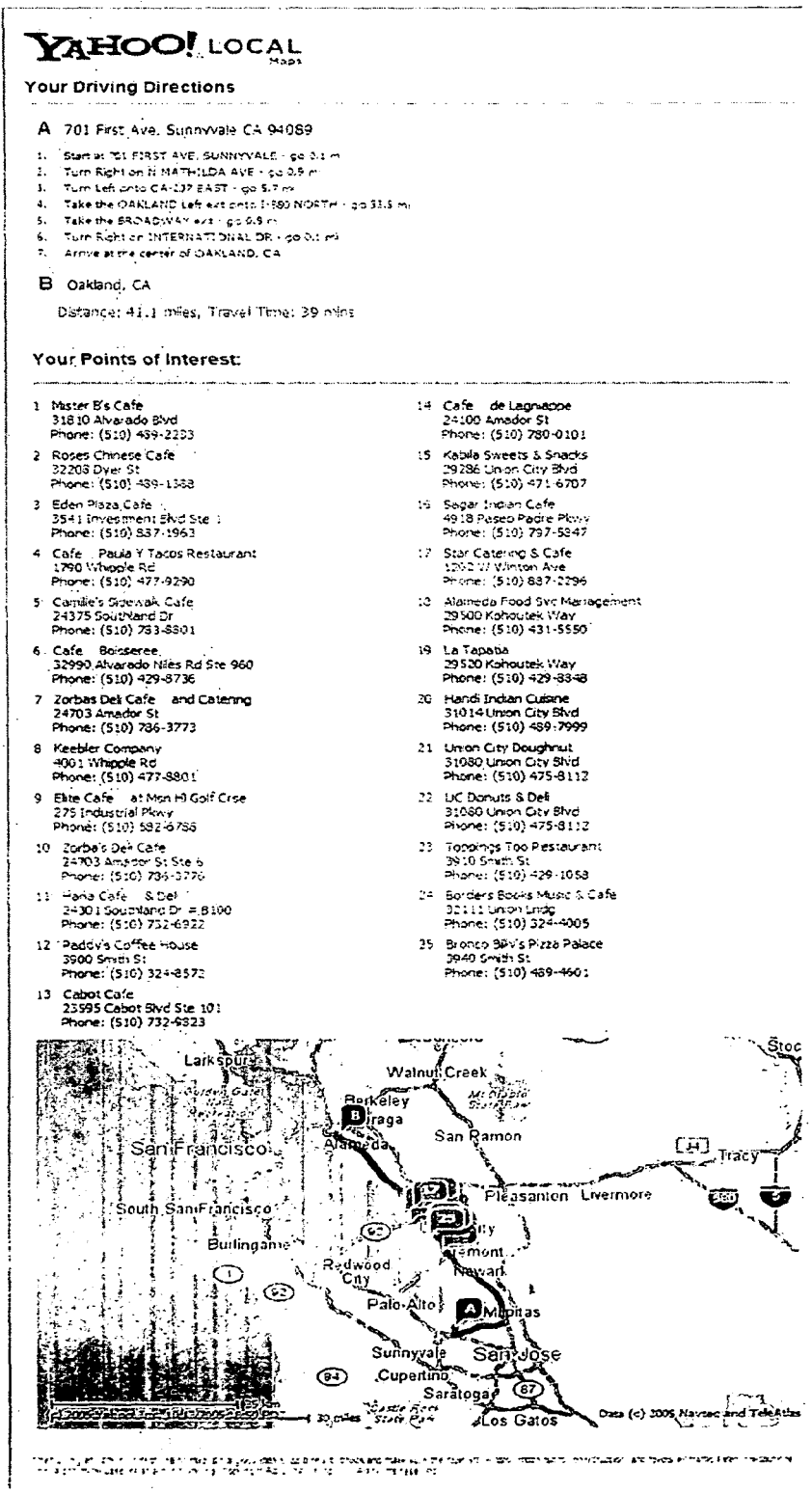
Figure 10C:
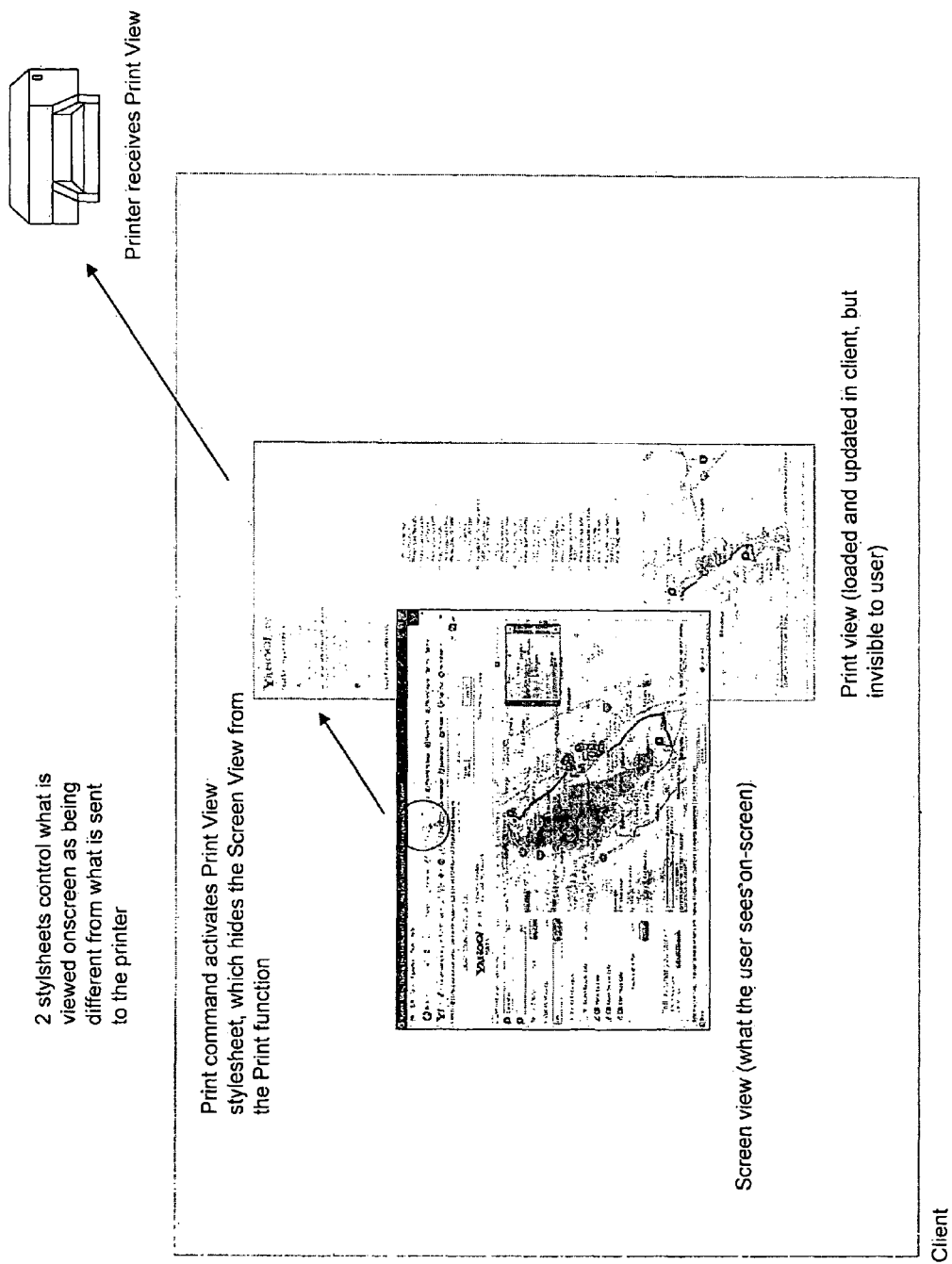

FIGS. 10a-10c illustrate a method for printing a map with directions and search results according to embodiments of the present invention. The interactive mapping system provides the capability of automatically sending a layout of the current map view (shown in FIG. 10a) and data that is optimized for printing. This occurs when the user selects the print function within the application or when the user chooses the print function from the browser. The printed version of the map and map data, as shown in FIG. 10b, is not what the user is seeing on the screen, such as a "print screen," but is a different layout specifically designed for printing. The print view of the same data is automatically sent to the printer. The user may also send a text-only variant.

In FIG. 10c, two stylesheets are used to control what is viewed onscreen as being different from what is sent to the printer. Stylesheet 1 designates the screen view and hides the print view; and stylesheet 2 designates the print view and is activated when the user initiates a print function either from within the application or from the browser print commands. This stylesheet also hides the screen view from the print function so that only the print view is sent to the printer.

Figure 11:
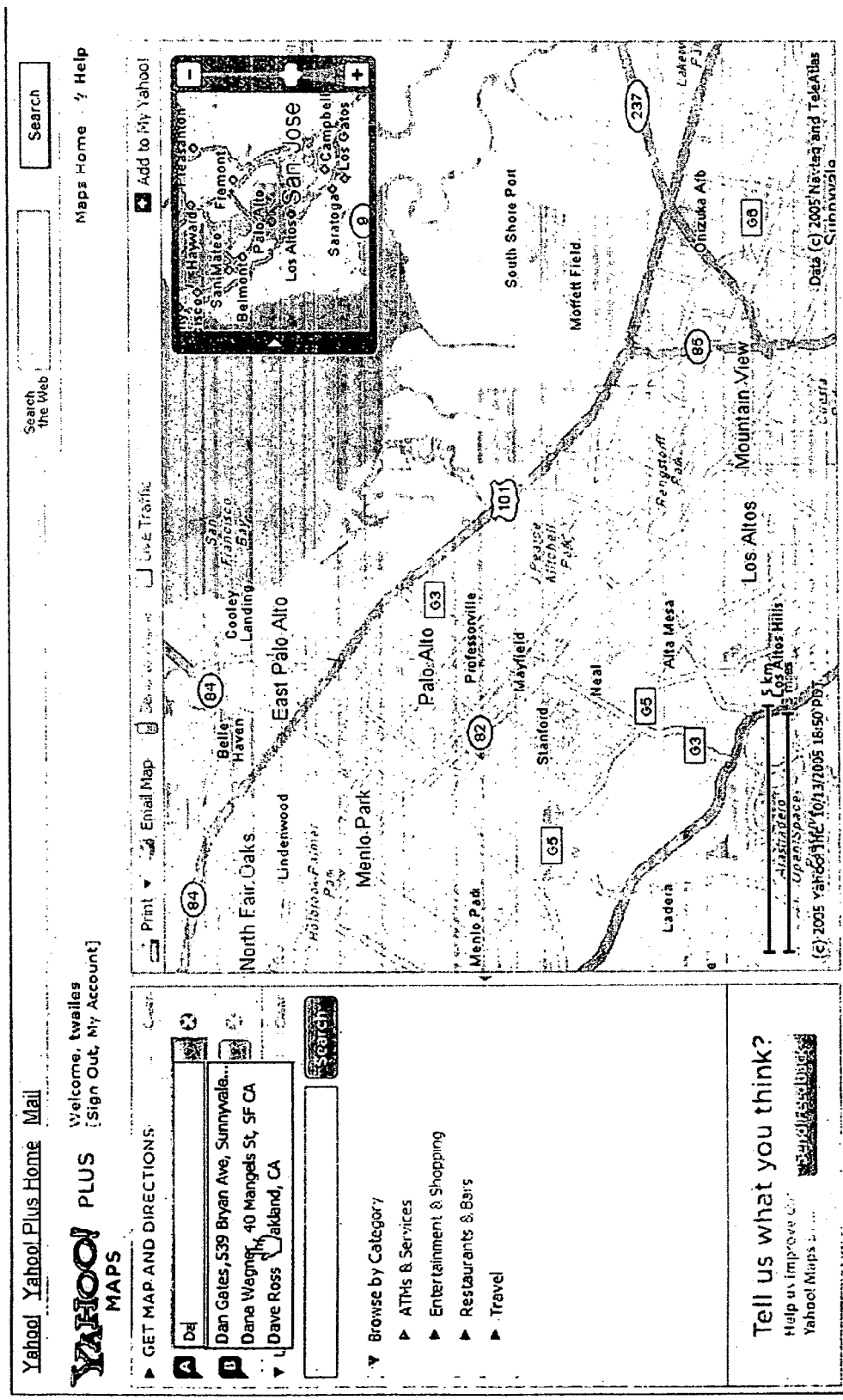
FIG. 11 illustrates a method for auto-completing an address entry using information from an address book according to an embodiment of the present invention.

FIG. 11 illustrates a method for auto-completing an address entry using information from an address book according to an embodiment of the present invention. The interactive mapping system provides the capability of displaying auto-complete selections drawn from the user's address book and the universal location manager (ULM). The ULM stores recently visited or previously saved locations. As the user types in letters or numbers of, for example, a person's name, nickname, or address, into a location box that match entries within his address book or ULM data, the system displays these matches for selection, as shown in FIG. 11. The user can choose to ignore or select these options. If the user selects one of these auto-complete options, the map then centers on the chosen address.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controller. Hence, references to specific functional units are only to be seen as references to suitable means for providing the described functionality rather than as indicative of a strict logical or physical structure or organization.

The invention can be implemented in any suitable form, including hardware, software, firmware, or any combination of them. The invention may optionally be implemented partly as computer software running on one or more data processors and/or digital signal processors. The elements and components of an embodiment of the invention may be physically, functionally, and logically implemented in any suitable way. Indeed the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method comprising:
    receiving, over a network, a set of address locations in a given order;
    presenting the set of address locations as a list of directions, the set of address locations being visibly displayed on a display of a user device;
    presenting the set of address locations graphically on a map that is visibly displayed on the display of the user device, wherein the map includes a route connecting the set of address locations according to the given order, and wherein the map further includes a marker for each of the address locations;
    providing a query string within a pair of marking characters in a uniform resource locator (URL) in a browser address;
    retrieving information describing a current map view using the query string in the URL;
    updating the URL to include information describing the current map view; and
    providing the URL to a second user; and
    presenting the current map view to the second user using the URL.

2. The method of claim 1 further comprising:
    creating a new order of the set of address locations from the given order by dragging an address location from the map to a different position in the list of directions;
    updating the list of directions according to the new order of the set of address locations; and
    updating the map according to the new order of the set of address locations.

3. The method of claim 1 further comprising:
    adding a new address location to the set of address locations;
    updating the list of directions to include the new address location; and
    updating the map to include the new address location.

4. The method of claim 1 further comprising:
    deleting a selected address location from the list of directions;
    updating the list of directions to exclude the selected address location; and
    updating the map to exclude the selected address location.

5. The method of claim 1 further comprising:
    creating a round trip by adding an end address location to the set of address locations, wherein the end address location includes the same address as the beginning address location;

updating the list of directions to include the end address location; and updating the map to include a route to the end address location.

6. The method of claim 1 further comprising:
identifying a current map view and its associated text information from a corresponding screen view in response to receiving a print map command from a user;
rearranging the current map view and its associated text information to create a print view; and
printing the print view.

7. The method of claim 6, wherein the text information comprises:
a start address;
an end address;
a list of driving directions from the start address to the end address; and
a list of points of interest shown in the current map view.

8. The method of claim 1 further comprising:
entering an address location in an address field; and
auto-completing the address location using information gathered from a list of recently visited or previously saved locations.

9. The method of claim 1 further comprising:
entering an address location in an address field; and
auto-completing the address location using information gathered from a user's address book.

10. A non-transitory computer-readable storage medium tangibly encoded with a computer program product comprising computer-executable instructions, that when executed by a computing device, perform a method comprising:
receiving, over a network, a set of address locations in a given order;
presenting the set of address locations as a list of directions; and
presenting the set of address locations graphically on a map, wherein the map includes a route connecting the set of address locations according to the given order, and wherein the map further includes a marker for each of the address locations; and
providing a query string within a pair of marking characters in a uniform resource locator (URL) in a browser address;
retrieving information describing a current map view using the query string in the URL;
updating the URL to include information describing the current map view,
providing the URL to a second user; and
presenting the current map view to the second user using the URL.

11. The non-transitory computer-readable storage medium of claim 10 further comprising:
creating a new order of the set of address locations from the given order by dragging an address location from the map to a different position in the list of directions;
updating the list of directions according to the new order of the set of address locations; and
updating the map according to the new order of the set of address locations.

12. The non-transitory computer-readable storage medium of claim 10 further comprising:
adding a new address location to the set of address locations;
updating the list of directions to include the new address location; and
updating the map to include the new address location.

13. The non-transitory computer-readable storage medium of claim 10 further comprising:
deleting a selected address location from the list of directions;
updating the list of directions to exclude the selected address location; and
updating the map to exclude the selected address location.

14. The non-transitory computer-readable storage medium of claim 10 further comprising:
creating a round trip by adding an end address location to the set of address locations, wherein the end address location includes the same address as the beginning address location;
updating the list of directions to include the end address location; and
updating the map to include a route to the end address location.

15. The non-transitory computer-readable storage medium of claim 10 further comprising:
identifying a current map view and its associated text information from a corresponding screen view in response to receiving a print map command from a user;
rearranging the current map view and its associated text information to create a print view; and
printing the print view.

16. The non-transitory computer-readable storage medium of claim 15, wherein the text information comprises:
a start address;
an end address;
a list of driving directions from the start address to the end address; and
a list of points of interest shown in the current map view.

17. The non-transitory computer-readable storage medium of claim 10 further comprising:
entering an address location in an address field; and
auto-completing the address location using information gathered from a list of recently visited or previously saved locations.

18. The non-transitory computer-readable storage medium of claim 10 further comprising:
entering an address location in an address field; and
auto-completing the address location using information gathered from a user's address book.

* * * * *